United States Patent
Asami

(10) Patent No.: US 11,886,040 B2
(45) Date of Patent: Jan. 30, 2024

(54) IMAGING LENS AND IMAGING APPARATUS

(71) Applicant: FUJIFILM Corporation, Tokyo (JP)

(72) Inventor: Taro Asami, Saitama (JP)

(73) Assignee: FUJIFILM Corporation, Tokyo (JP)

(*) Notice: Subject to any disclaimer, the term of this patent is extended or adjusted under 35 U.S.C. 154(b) by 671 days.

(21) Appl. No.: 17/102,504

(22) Filed: Nov. 24, 2020

(65) Prior Publication Data

US 2021/0080693 A1   Mar. 18, 2021

Related U.S. Application Data

(63) Continuation of application No. PCT/JP2019/019953, filed on May 20, 2019.

(30) Foreign Application Priority Data

Jun. 5, 2018   (JP) .................. 2018-107859

(51) Int. Cl.
*G02B 9/64* (2006.01)
*G02B 13/18* (2006.01)

(52) U.S. Cl.
CPC ............... *G02B 9/64* (2013.01); *G02B 13/18* (2013.01)

(58) Field of Classification Search
CPC .................. G02B 9/64; G02B 13/04
See application file for complete search history.

(56) References Cited

U.S. PATENT DOCUMENTS

| 4,256,373 | A | 3/1981 | Horimoto |
| 6,353,504 | B1 | 3/2002 | Yamamoto |
| 2013/0141629 | A1 | 6/2013 | Yoshinaga et al. |
| 2015/0268460 | A1 | 9/2015 | Takada |
| 2016/0370571 | A1 | 12/2016 | Togino |
| 2017/0219820 | A1* | 8/2017 | Kobayashi ............. G02B 13/06 |

FOREIGN PATENT DOCUMENTS

| CN | 104076483 A | 10/2014 |
| JP | S54-032319 A | 3/1979 |
| JP | 2001-091832 A | 4/2001 |
| JP | 2001-133685 A | 5/2001 |
| JP | 2015-210291 A | 11/2015 |
| JP | 5830638 B2 | 12/2015 |
| WO | 2014/088104 A1 | 6/2014 |

OTHER PUBLICATIONS

Office Action issued in JP 2018-107859; mailed by the Japanese Patent Office dated Dec. 3, 2019.
International Search Report issued in PCT/JP2019/019953; dated Aug. 20, 2019.
International Preliminary Report On Patentability issued in PCT/JP2019/019953; completed Nov. 26, 2019.
Written Opinion issued in PCT/JP2019/019953; dated Aug. 20, 2019.

* cited by examiner

*Primary Examiner* — Alicia M Harrington
(74) *Attorney, Agent, or Firm* — Studebaker & Brackett PC

(57) ABSTRACT

The imaging lens includes only eight lenses consisting of, in order from an object side, a negative first lens, a negative second lens, a positive third lens convex toward an image side, a positive fourth lens convex toward an object side, a negative fifth lens, a positive sixth lens convex toward the image side, a positive seventh lens convex toward the object side, and a negative eighth lens, as lenses having refractive powers, in which predetermined conditional expressions are satisfied.

18 Claims, 10 Drawing Sheets

EXAMPLE 2

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

IMAGING LENS AND IMAGING APPARATUS

CROSS REFERENCE TO RELATED APPLICATIONS

The present application is a Continuation of PCT International Application No. PCT/JP2019/019953 filed on May 20, 2019, which claims priority under 35 U.S.C. § 119(a) to Japanese Patent Application No. 2018-107859 filed on Jun. 5, 2018. Each of the above applications is hereby expressly incorporated by reference in its entirety, into the present application.

BACKGROUND OF THE INVENTION

1. Field of the Invention

The present disclosure relates to an imaging lens and an imaging apparatus.

2. Description of the Related Art

In recent years, an imaging element such as a charge coupled device (CCD) or a complementary metal oxide semiconductor (CMOS) used in combination with an imaging lens has been greatly reduced in size and increased in the number of pixels included therein. According to this, an imaging apparatus comprising the imaging element has also been reduced in size, and it is required that an imaging lens mounted on the imaging apparatus is configured to be small in size by minimizing the number of lenses while ensuring favorable optical performance.

As an imaging lens in consideration of achieving reduction in size, for example, a lens system disclosed in JP5830638B is known. JP5830638B discloses a single focus lens system in which the number of lenses is 6 to 8.

SUMMARY OF THE INVENTION

By the way, the demand for the imaging lens is becoming stricter year by year, and higher performance is required. In addition, an imaging lens having a small F-number may be required depending on an imaging environment and/or an imaging target. However, the lens system disclosed in JP5830638B does not have an F-number small enough to meet this requirement.

The present disclosure has been made in view of the above circumstances. An object of an embodiment of the present invention is to provide an imaging lens which has a small F-number and has high optical performance by satisfactorily correcting various aberrations, and an imaging apparatus comprising the imaging lens.

Specific means for solving the above problem includes the following aspects.

An imaging lens according to a first aspect comprises: only eight lenses consisting of, in order from an object side to an image side, a first lens that has a negative refractive power, a second lens that has a negative refractive power, a third lens that has a positive refractive power and of which an image side surface is convex, a fourth lens that has a positive refractive power and of which an object side surface is convex, a fifth lens that has a negative refractive power, a sixth lens that has a positive refractive power and of which an image side surface is convex, a seventh lens that has a positive refractive power and of which an object side surface is convex, and an eighth lens that has a negative refractive power, as lenses having refractive powers. Assuming that an Abbe number of the fifth lens at a d line is vd5, Conditional Expression (1) is satisfied, which is represented by $$vd5<23 \quad (1).$$

An imaging lens according to a second aspect comprises: only eight lenses consisting of, in order from an object side to an image side, a first lens that has a negative refractive power, a second lens that has a negative refractive power, a third lens that has a positive refractive power and of which an image side surface is convex, a fourth lens that has a positive refractive power and of which an object side surface is convex, a fifth lens that has a negative refractive power, a sixth lens that has a positive refractive power and of which an image side surface is convex, a seventh lens that has a positive refractive power and of which an object side surface is convex, and an eighth lens that has a negative refractive power, as lenses having refractive powers. Assuming that a distance on an optical axis between the second lens and the third lens is Db23 and a focal length of a whole system is f, Conditional Expression (2) is satisfied, which is represented by $$0.8<Db23/f<7 \quad (2).$$

An imaging lens according to a third aspect comprises: only eight lenses consisting of, in order from an object side to an image side, a first lens that has a negative refractive power, a second lens that has a negative refractive power, a third lens that has a positive refractive power and of which an image side surface is convex, a fourth lens that has a positive refractive power and of which an object side surface is convex, a fifth lens that has a negative refractive power, a sixth lens that has a positive refractive power and of which an image side surface is convex, a seventh lens that has a positive refractive power and of which an object side surface is convex, and an eighth lens that has a negative refractive power, as lenses having refractive powers. Assuming that a composite focal length of the fourth lens, the fifth lens, and the sixth lens is f456 and a focal length of a whole system is f, Conditional Expression (3) is satisfied, which is represented by $$3<f456/f<28 \quad (3).$$

In at least one of the imaging lenses according to the first, second, and third aspects, it is preferable that, in the third lens, an absolute value of a radius of curvature of the image side surface is smaller than an absolute value of a radius of curvature of an object side surface.

In at least one of the imaging lenses according to the first, second, and third aspects, it is preferable that, in the fourth lens, an absolute value of a radius of curvature of an image side surface is larger than an absolute value of a radius of curvature of the object side surface.

In at least one of the imaging lenses according to the first, second, and third aspects, it is preferable that, in the sixth lens, an absolute value of a radius of curvature of the image side surface is smaller than an absolute value of a radius of curvature of an object side surface.

In at least one of the imaging lenses according to the first, second, and third aspects, it is preferable that, in the seventh lens, an absolute value of a radius of curvature of an image side surface is larger than an absolute value of a radius of curvature of the object side surface.

In at least one of the imaging lenses according to the first, second, and third aspects, it is preferable that any one of the following conditional expressions or any combination of two or more thereof is satisfied.

$$-8 < f1/f < -0.5 \quad (4)$$

$$-8 < f12/f < -0.5 \quad (5)$$

$$f45/f < -0.5 \quad (6)$$

$$2 < f23/f < 30 \quad (7)$$

$$0.5 < f6/f \quad (8)$$

$$0.5 < f7/f \quad (9)$$

$$3 < TL/f < 20 \quad (10)$$

$$0.5 < Bf/f < 5 \quad (11)$$

$$0.6 < ED8r/Bf < 2.2 \quad (12)$$

Here,
f1: focal length of first lens
f: focal length of whole system
f12: composite focal length of first lens and second lens
f45: composite focal length of fourth lens and fifth lens
f23: composite focal length of second lens and third lens
f6: focal length of sixth lens
f7: focal length of seventh lens
TL: sum of distance on optical axis from object side surface of first lens to image side surface of eighth lens and back focal length as air conversion distance
Bf: back focal length as air conversion distance
ED8r: effective diameter of image side surface of eighth lens An imaging apparatus according to the fourth aspect comprises at least one of the imaging lenses according to the first, second, and third aspects.

In the present specification, it should be noted that the terms "consisting of" and "consists of" mean that the imaging lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

For a lens including an aspherical surface, the sign of the refractive power, the surface shape of the lens, and the radius of curvature are assumed as those in the paraxial region unless otherwise specified. Reference signs of radii of curvature of surface shapes convex toward the object side are set to be positive, and reference signs of radii of curvature of surface shapes convex toward the image side are set to be negative. The term "a lens having a positive refractive power" and the term "a positive lens" are synonymous. The term "a lens having a negative refractive power" and the term "a negative lens" are synonymous. The term "a back focal length" is the distance on the optical axis from the lens surface closest to the image side to the focal position on the image side.

The term "a focal length" used in the conditional expression is a paraxial focal length. The values of the conditional expression are values on the d line basis. The "d line", "C line", and "F line" described in the present specification are emission lines, and the wavelength of the d line is 587.56 nm (nanometers), the wavelength of the C line is 656.27 nm (nanometers), and the wavelength of the F line is 486.13 nm (nanometers).

According to the embodiment of the present invention, it is possible to provide an imaging lens which has a small F-number and has high optical performance by satisfactorily correcting various aberrations, and an imaging apparatus comprising the imaging lens.

DESCRIPTION OF THE PREFERRED EMBODIMENTS

Figure 1:
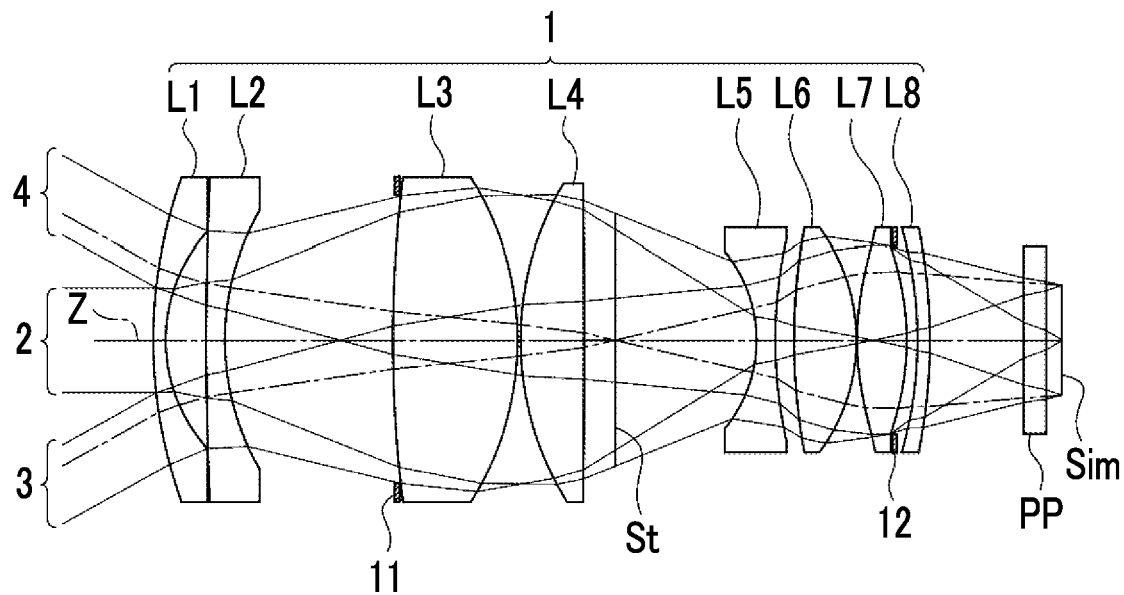
FIG. 1 is a cross-sectional view showing a configuration of an imaging lens (an imaging lens of Example 1 of the present invention) according to an embodiment of the present invention.

Hereinafter, embodiments of an imaging lens of the present disclosure will be described in detail with reference to the drawings. FIG. 1 shows a configuration of a cross section including an optical axis Z of an imaging lens 1 according to an embodiment of the present invention. An example shown in FIG. 1 corresponds to Example 1 described below. In FIG. 1, the left side is shown as an object side and the right side is shown as an image side. FIG. 1 also shows on-axis rays 2 from an object point at an infinite distance and rays 3 and 4 with the maximum angle of view.

FIG. 1 shows an example in which, assuming that the imaging lens 1 is applied to an imaging apparatus, a plane-parallel-plate-like optical member PP is disposed between the imaging lens 1 and an image plane Sim. The optical member PP is a member assumed to include various filters and/or a cover glass. The various filters include, for example, a low pass filter, an infrared cut filter, and a filter that cuts a specific wavelength region. The optical member PP is a member having no refractive power, and the optical member PP may be configured to be omitted.

The imaging lens 1 comprises only eight lenses consisting of, in order from an object side to an image side, a first lens L1 having a negative refractive power, a second lens L2 having a negative refractive power, a third lens L3 having a positive refractive power, a fourth lens L4 having a positive refractive power, a fifth lens L5 having a negative refractive power, a sixth lens L6 having a positive refractive power, a seventh lens L7 having a positive refractive power, and an eighth lens L8 having a negative refractive power, as lenses having refractive powers. An image side surface of the third lens L3 is convex. An object side surface of the fourth lens L4 is convex. An image side surface of the sixth lens L6 is convex. An object side surface of the seventh lens L7 is convex. The above configuration related to the imaging lens 1 will be referred to as a basic configuration.

The first lens L1 and the second lens L2, which are the first and second lenses from the object side, are configured to be negative lenses, in which a negative refractive power is provided on the object side, and the negative refractive power is shared between the two lenses, whereby it is easy to suppress distortion. The first lens L1 may be, for example, a negative meniscus lens convex toward the object side. In such a case, it is easier to suppress distortion. The second lens L2 may be, for example, a negative meniscus lens convex toward the object side. In such a case, it is easier to suppress distortion.

The third lens L3 and the fourth lens L4 are configured to be positive lenses, whereby it is easy to correct spherical aberration. The convex surfaces of the third lens L3 and the fourth lens L4 are configured to face each other, and by this configuration, it is easier to correct spherical aberration. In the third lens L3, it is preferable that an absolute value of a radius of curvature of the image side surface is smaller than an absolute value of a radius of curvature of an object side surface. In such a case, it is easy to correct spherical aberration and astigmatism. In the fourth lens L4, it is preferable that an absolute value of a radius of curvature of an image side surface is larger than an absolute value of a radius of curvature of the object side surface. In such a case, it is easy to correct spherical aberration and astigmatism.

The fifth lens L5 is configured to be a negative lens, whereby it is easy to satisfactorily correct chromatic aberration. The fifth lens L5 may be, for example, a biconcave lens. In such a case, it is easy to give a strong negative refractive power to the fifth lens L5, and it is easier to satisfactorily correct chromatic aberration.

The sixth lens L6 and the seventh lens L7 are configured to be positive lenses, whereby it is easy to correct spherical aberration. The convex surfaces of the sixth lens L6 and the seventh lens L7 are configured to face each other, and by this configuration, it is easier to correct spherical aberration. In the sixth lens L6, it is preferable that an absolute value of a radius of curvature of the image side surface is smaller than an absolute value of a radius of curvature of an object side surface. In such a case, it is easy to correct spherical aberration and astigmatism. In the seventh lens L7, it is preferable that an absolute value of a radius of curvature of an image side surface is larger than an absolute value of a radius of curvature of the object side surface. In such a case, it is easy to correct spherical aberration and astigmatism. The sixth lens L6 may be, for example, a biconvex lens. The seventh lens L7 may be, for example, a biconvex lens.

The eighth lens L8 is configured to be a negative lens, whereby it is easy to satisfactorily correct chromatic aberration. An object side surface of the eighth lens L8 may be concave, for example. The eighth lens L8 may be a negative meniscus lens concave toward the object side, or may be a biconcave lens. In a case where the eighth lens L8 is a negative meniscus lens concave toward the object side, there is an advantage in improving the telecentricity. In a case where the eighth lens L8 is a biconcave lens, it is easier to correct chromatic aberration.

In the example of FIG. 1, as an example, an aperture stop St is disposed between the object side surface of the fourth lens L4 and the image side surface of the fifth lens L5. The aperture stop St is disposed in the middle of the lens system in this way, whereby it is easy to reduce the diameters of both the lens closest to the object side and the lens closest to the image side. The aperture stop St shown in FIG. 1 does not represent the shape or size, but the position on the optical axis Z.

Further, in the example of FIG. 1, all of the first lens L1 to the eighth lens L8 are single lenses. In a case where all the lenses are single lenses, there is an advantage in heat resistance and environment resistance. The "single lens" as used herein means one lens that is not cemented. Note that, a compound aspherical lens (a lens which is integrally compound of a spherical lens and a film having an aspherical shape formed on the spherical lens, and functions as one aspherical lens as a whole) is not regarded as a cemented lens, and is treated as one lens.

The imaging lens 1 may be configured to include an aspherical lens having an aspherical shape. In the example of FIG. 1, the seventh lens L7 is an aspherical lens, and the other lenses are spherical lenses. By using an aspherical lens as the positive lens closest to the image plane Sim, there is an advantage in improving the telecentricity while suppressing various aberrations.

Next, a preferable configuration relating to the conditional expression will be described. It is preferable that the imaging lens 1 satisfies any one of the following conditional expressions or any combination of two or more thereof.

$$vd5 < 23 \tag{1}$$

$$0.8 < Db23/f < 7 \tag{2}$$

$$3 < f456/f < 28 \tag{3}$$

$$-8 < f1/f < -0.5 \tag{4}$$

$$-8 < f12/f < -0.5 \tag{5}$$

$$f45/f < -0.5 \tag{6}$$

$$2 < f23/f < 30 \tag{7}$$

$$0.5 < f6/f \tag{8}$$

$$0.5 < f7/f \tag{9}$$

$$3 < TL/f < 20 \tag{10}$$

$$0.5 < Bf/f < 5 \tag{11}$$

$$0.6 < ED8r/Bf < 2.2 \tag{12}$$

$$0 \leq (R1f + R1r)/(R1f - R1r) < 8 \tag{13}$$

$$0 \leq (R2f + R2r)/(R2f - R2r) < 5 \tag{14}$$

$$0 \leq (R3f + R3r)/(R3f - R3r) < 5 \tag{15}$$

$$(R5f+R5r)/(R5f-R5r) \leq 0 \tag{16}$$

$$30 < vd1 \tag{17}$$

$$30 < vd2 \tag{18}$$

$$30 < vd3 \tag{19}$$

$$30 < vd4 \tag{20}$$

$$20 < vd6 \tag{21}$$

$$30 < vd7 \tag{22}$$

$$vd8 < 30 \tag{23}$$

Here,
vd5: Abbe number of fifth lens at d line
Db23: distance on optical axis between second lens and third lens
f: focal length of whole system
f456: composite focal length of fourth lens, fifth lens, and sixth lens
f1: focal length of first lens
f12: composite focal length of first lens and second lens
f45: composite focal length of fourth lens and fifth lens
f23: composite focal length of second lens and third lens
f6: focal length of sixth lens
f7: focal length of seventh lens
TL: sum of distance on optical axis from object side surface of first lens to image side surface of eighth lens and back focal length as air conversion distance
Bf: back focal length as air conversion distance
ED8r: effective diameter of image side surface of eighth lens
R1f: radius of curvature of object side surface of first lens
R1r: radius of curvature of image side surface of first lens
R2f: radius of curvature of object side surface of second lens
R2r: radius of curvature of image side surface of second lens
R3f: radius of curvature of object side surface of third lens
R3r: radius of curvature of image side surface of third lens
R5f: radius of curvature of object side surface of fifth lens
R5r: radius of curvature of image side surface of fifth lens
vd1: Abbe number of first lens at d line
vd2: Abbe number of second lens at d line
vd3: Abbe number of third lens at d line
vd4: Abbe number of fourth lens at d line
vd6: Abbe number of sixth lens at d line
vd7: Abbe number of seventh lens at d line
vd8: Abbe number of eighth lens at d line By not allowing the result of Conditional Expression (1) to be equal to or greater than the upper limit, it is easy to correct longitudinal chromatic aberration. In order to ensure favorable resolution performance while reducing an F-number, it is necessary to suppress longitudinal chromatic aberration satisfactorily. Therefore, by satisfying Conditional Expression (1), it is easy to realize a lens system having a small F-number and favorable performance vd5 of Conditional Expression (1) is more preferably smaller than 21, still more preferably smaller than 20, still more preferably smaller than 19, and still more preferably smaller than 18. Further, vd5 is preferably greater than 16, and in such a case, it is easy to reduce a cost of a material. vd5 is more preferably greater than 17, and still more preferably greater than 17.2. From the above, it is more preferable to satisfy at least one of Conditional Expressions (1-1) to (1-3).

$$16 < vd5 < 23 \tag{1-1}$$

$$16 < vd5 < 21 \tag{1-2}$$

$$17.2 < vd5 < 19 \tag{1-3}$$

By not allowing the result of Conditional Expression (2) to be equal to or less than the lower limit, the air gap between the second lens L2 and the third lens L3 can be made large, and it is easy to correct distortion and spherical aberration. By not allowing the result of Conditional Expression (2) to be equal to or greater than the upper limit, it is easy to reduce the size of the lens system.

Db23/f in Conditional Expression (2) is more preferably greater than 1, still more preferably greater than 1.2, and still more preferably greater than 1.5. Further, Db23/f is more preferably smaller than 5, still more preferably smaller than 4, still more preferably smaller than 3, and still more preferably smaller than 2.5. From the above, it is more preferable to satisfy at least one of Conditional Expressions (2-1) to (2-3).

$$1 < Db23/f < 5 \tag{2-1}$$

$$1.2 < Db23/R4 \tag{2-2}$$

$$1.5 < Db23/R3 \tag{2-3}$$

By not allowing the result of Conditional Expression (3) to be equal to or less than the lower limit, it is easy to increase the negative refractive power of the fifth lens L5, and it is easy to correct chromatic aberration. By not allowing the result of Conditional Expression (3) to be equal to or greater than the upper limit, it is easy to increase the positive refractive power of the fourth lens L4 and the sixth lens L6, and it is easy to correct spherical aberration. By satisfying Conditional Expression (3), it is easy to correct spherical aberration and chromatic aberration.

f456/f in Conditional Expression (3) is more preferably greater than 4, still more preferably greater than 4.5, and still more preferably greater than 5. Further, f456/f is more preferably smaller than 25, still more preferably smaller than 20, still more preferably smaller than 15, and still more preferably smaller than 12. From the above, it is more preferable to satisfy at least one of Conditional Expressions (3-1) to (3-3).

$$4 < f456/f < 25 \tag{3-1}$$

$$4.5 < f456/f < 15 \tag{3-2}$$

$$5 < f456/f < 12 \tag{3-3}$$

By not allowing the result of Conditional Expression (4) to be equal to or less than the lower limit, it is easy to increase the refractive power of the first lens L1, and it is easy to increase the angle of view. By not allowing the result of Conditional Expression (4) to be equal to or greater than the upper limit, it is easy to prevent the refractive power of the first lens L1 from being excessively strong, and it is easy to correct distortion.

f1/f in Conditional Expression (4) is more preferably greater than −6.5, still more preferably greater than −5.5, and still more preferably greater than −4. Further, f1/f is more preferably smaller than −1, still more preferably smaller than −2, and still more preferably smaller than −2.5. From the above, it is more preferable to satisfy at least one of Conditional Expressions (4-1) to (4-3).

$$-6.5 < f1/f < -1 \tag{4-1}$$

$$-5.5 < f1/f < -2 \tag{4-2}$$

$$-4 < f1/f < -2.5 \tag{4-3}$$

By not allowing the result of Conditional Expression (5) to be equal to or less than the lower limit, it is easy to increase the refractive power of the first lens L1 and the second lens L2, and it is easy to increase the angle of view. By not allowing the result of Conditional Expression (5) to be equal to or greater than the upper limit, it is easy to prevent the refractive power of the first lens L1 and the second lens L2 from being excessively strong, and it is easy to correct distortion.

f12/f in Conditional Expression (5) is more preferably greater than −6, still more preferably greater than −5, still more preferably greater than −4, and still more preferably greater than −3. Further, f12/f is more preferably smaller than −0.8, still more preferably smaller than −1, and still more preferably smaller than −1.5. From the above, it is more preferable to satisfy at least one of Conditional Expressions (5-1) to (5-3).

$$-5<f12/f<-0.8 \quad (5\text{-}1)$$

$$-4<f12/f<-1 \quad (5\text{-}2)$$

$$-3<f12/f<-1.5 \quad (5\text{-}3)$$

By not allowing the result of Conditional Expression (6) to be equal to or greater than the upper limit, it is easy to increase the refractive power of the fourth lens L4, and it is easy to correct spherical aberration.

f45/f in Conditional Expression (6) is more preferably smaller than −1, still more preferably smaller than −2, and still more preferably smaller than −3. Further, f45/f is preferably greater than −20, and in such a case, it is easy to increase the refractive power of the fifth lens L5, and it is easy to correct longitudinal chromatic aberration. f45/f is more preferably greater than −18, still more preferably greater than −15, and still more preferably greater than −11. From the above, it is more preferable to satisfy at least one of Conditional Expressions (6-1) to (6-4).

$$-20<f45/f<-0.5 \quad (6\text{-}1)$$

$$-18<f45/f<-1 \quad (6\text{-}2)$$

$$-15<f45/f<-2 \quad (6\text{-}3)$$

$$-11<f45/f<-3 \quad (6\text{-}4)$$

By not allowing the result of Conditional Expression (7) to be equal to or less than the lower limit, it is easy to increase the refractive power of the third lens L3, and it is easy to correct spherical aberration and astigmatism. By not allowing the result of Conditional Expression (7) to be equal to or greater than the upper limit, it is easy to increase the refractive power of the second lens L2, and it is easy to increase the angle of view and to ensure the back focal length.

f23/f in Conditional Expression (7) is more preferably greater than 3, still more preferably greater than 4, and still more preferably greater than 5. Further, f23/f is more preferably smaller than 25, still more preferably smaller than 22, and still more preferably smaller than 20. From the above, it is more preferable to satisfy at least one of Conditional Expressions (7-1) to (7-3).

$$3<f23/f<25 \quad (7\text{-}1)$$

$$4<f23/f<22 \quad (7\text{-}2)$$

$$5<f23/f<20 \quad (7\text{-}3)$$

By not allowing the result of Conditional Expression (8) to be equal to or less than the lower limit, it is easy to prevent the refractive power of the sixth lens L6 from being excessively strong, and it is easy to ensure the back focal length.

f6/f in Conditional Expression (8) is more preferably greater than 0.8, still more preferably greater than 1, and still more preferably greater than 1.5. Further, f6/f is preferably smaller than 10, and in such a case, it is easy to increase the refractive power of the sixth lens L6, and it is easy to correct spherical aberration. f6/f is more preferably smaller than 8, still more preferably smaller than 5, still more preferably smaller than 3, and still more preferably smaller than 2. From the above, it is more preferable to satisfy at least one of Conditional Expressions (8-1) to (8-4).

$$0.5<f6/f<10 \quad (8\text{-}1)$$

$$0.8<f6/f<5 \quad (8\text{-}2)$$

$$1<f6/f<3 \quad (8\text{-}3)$$

$$1.5<f6/f<2 \quad (8\text{-}4)$$

By not allowing the result of Conditional Expression (9) to be equal to or less than the lower limit, it is easy to prevent the refractive power of the seventh lens L7 from being excessively strong, and it is easy to ensure the back focal length.

f7/f in Conditional Expression (9) is more preferably greater than 0.8, still more preferably greater than 1, and still more preferably greater than 1.5. Further, f7/f is preferably smaller than 10, and in such a case, it is easy to increase the refractive power of the seventh lens L7, and it is easy to correct spherical aberration. f7/f is more preferably smaller than 8, still more preferably smaller than 5, still more preferably smaller than 3, and still more preferably smaller than 2.5. From the above, it is more preferable to satisfy at least one of Conditional Expressions (9-1) to (9-4).

$$0.5<f7/f<10 \quad (9\text{-}1)$$

$$0.8<f7/f<5 \quad (9\text{-}2)$$

$$1<f7/f<3 \quad (9\text{-}3)$$

$$1.5<f7/f<2.5 \quad (9\text{-}4)$$

TL in Conditional Expression (10) is the total length of the lens system. By not allowing the result of Conditional Expression (10) to be equal to or less than the lower limit, it is easy to prevent the number and shape of lenses from being restricted due to the excessively short total length, and it is easy to ensure favorable resolution performance. Alternatively, by not allowing the result of Conditional Expression (10) to be equal to or less than the lower limit, it is easy to shorten the focal length with respect to the total length, and it is easy to increase the angle of view. By not allowing the result of Conditional Expression (10) to be equal to or greater than the upper limit, it is easy to prevent the total length from being excessively long.

TL/f in Conditional Expression (10) is more preferably greater than 5, still more preferably greater than 6, still more preferably greater than 7, and still more preferably greater than 8. Further, TL/f is more preferably smaller than 18, still more preferably smaller than 15, and still more preferably smaller than 12. From the above, it is more preferable to satisfy at least one of Conditional Expressions (10-1) to (10-3).

$$5<TL/f<18 \quad (10\text{-}1)$$

$$6<TL/f<15 \quad (10\text{-}2)$$

$$8<TL/f<12 \quad (10\text{-}3)$$

By not allowing the result of Conditional Expression (11) to be equal to or lower than the lower limit, it is easy to sufficiently ensure the back focal length. By not allowing the result of Conditional Expression (11) to be equal to or greater than the upper limit, it is easy to prevent the lens system from being large due to the excessively long back focal length.

Bf/f in Conditional Expression (11) is more preferably greater than 0.6, still more preferably greater than 0.7, still more preferably greater than 0.8, and still more preferably greater than 0.9. Further, Bf/f is more preferably smaller than 4, still more preferably smaller than 3, and still more preferably smaller than 2. From the above, it is more preferable to satisfy at least one of Conditional Expressions (11-1) to (11-3).

$$0.7 < Bf/f < 4 \tag{11-1}$$

$$0.8 < Bf/f < 3 \tag{11-2}$$

$$0.9 < Bf/f < 2 \tag{11-3}$$

By not allowing the result of Conditional Expression (12) to be equal to or less than the lower limit, it is easy to prevent the lens system from being large due to the excessively long back focal length. By not allowing the result of Conditional Expression (12) to be equal to or greater than the upper limit, it is easy to suppress an increase in the effective diameter, and it is easy to reduce the lens diameter. Note that, the term "effective diameter of the surface" means the diameter of a circle consisting of outermost points in a direction of the diameter (points farthest from the optical axis) among points at which all rays contributing to image formation intersect the lens surface. The effective diameter can be determined based on the size of the imaging surface of the imaging element, for example, in a case where the lens system is used in combination with the imaging element. In a case where the imaging surface is rectangular and the intersection of two diagonal lines of the rectangle passes through the optical axis of the lens system, for example, ½ of the diagonal line may be considered as the maximum image height to determine the effective diameter. In a case where a light shielding member having an opening is disposed in the lens system, the effective diameter may be determined in consideration of the light shielding member.

ED8r/Bf in Conditional Expression (12) is more preferably greater than 0.7, still more preferably greater than 0.8, still more preferably greater than 0.9, still more preferably greater than 1, still more preferably greater than 1.1, and still more preferably greater than 1.2. Further, ED8r/Bf is more preferably smaller than 2, still more preferably smaller than 1.8, still more preferably smaller than 1.7, and still more preferably smaller than 1.6. From the above, it is more preferable to satisfy at least one of Conditional Expressions (12-1) to (12-3).

$$0.8 < ED8r/Bf < 2 \tag{12-1}$$

$$1 < ED8r/Bf < 1.8 \tag{12-2}$$

$$1.1 < ED8r/Bf < 1.7 \tag{12-3}$$

By allowing the result of Conditional Expression (13) to be equal to or greater than the lower limit, it is easy to correct distortion. By not allowing the result of Conditional Expression (13) to be equal to or greater than the upper limit, it is easy to increase the angle of view and ensure the back focal length.

(R1f+R1r)/(R1f−R1r) in Conditional Expression (13) is more preferably greater than 1, still more preferably greater than 1.2, and still more preferably greater than 1.4. Further, (R1f+R1r)/(R1f−R1r) is more preferably smaller than 5, still more preferably smaller than 4, and still more preferably smaller than 3. From the above, it is more preferable to satisfy at least one of Conditional Expressions (13-1) to (13-3).

$$1 \le (R1f+R1r)/(R1f-R1r) < 5 \tag{13-1}$$

$$1.3 < (R1f+R1r)/(R1f-R1r) < 4 \tag{13-2}$$

$$1.5 < (R1f+R1r)/(R1f-R1r) < 3 \tag{13-3}$$

By allowing the result of Conditional Expression (14) to be equal to or greater than the lower limit, it is easy to correct distortion. By not allowing the result of Conditional Expression (14) to be equal to or greater than the upper limit, it is easy to increase the angle of view and ensure the back focal length.

(R2f+R2r)/(R2f−R2r) in Conditional Expression (14) is more preferably greater than 0.5, still more preferably greater than 1, and still more preferably greater than 1.05. Further, (R2f+R2r)/(R2f−R2r) is more preferably smaller than 4, still more preferably smaller than 3, and still more preferably smaller than 2.5. From the above, it is more preferable to satisfy at least one of Conditional Expressions (14-1) to (14-3).

$$0.5 < (R2f+R2r)/(R2f-R2r) < 4 \tag{14-1}$$

$$1 < (R2f+R2r)/(R2f-R2r) < 3 \tag{14-2}$$

$$1.05 < (R2f+R2r)/(R2f-R2r) < 2.5 \tag{14-3}$$

By allowing the result of Conditional Expression (15) to be equal to or greater than the lower limit, it is easy to correct spherical aberration and astigmatism. By not allowing the result of Conditional Expression (15) to be equal to or greater than the upper limit, it is easy to correct spherical aberration.

(R3f+R3r)/(R3f−R3r) in Conditional Expression (15) is more preferably greater than 0.2, still more preferably greater than 0.3, and still more preferably greater than 0.4. Further, (R3f+R3r)/(R3f−R3r) is more preferably smaller than 4, still more preferably smaller than 3, and still more preferably smaller than 2. From the above, it is more preferable to satisfy at least one of Conditional Expressions (15-1) to (15-3).

$$0.2 < (R3f+R3r)/(R3f-R3r) < 4 \tag{15-1}$$

$$0.3 < (R3f+R3r)/(R3f-R3r) < 3 \tag{15-2}$$

$$0.4 < (R3f+R3r)/(R3f-R3r) < 2 \tag{15-3}$$

By allowing the result of Conditional Expression (16) to be equal to or less than the upper limit, in the fifth lens L5, it is easy to make the absolute value of the radius of curvature of the object side surface smaller than the absolute value of the radius of curvature of the image side surface, and it is easy to correct coma aberration and astigmatism and to take the long back focal length.

(R5f+R5r)/(R5f−R5r) in Conditional Expression (16) is more preferably smaller than −0.1, still more preferably smaller than −0.2, and still more preferably smaller than −0.3. Further, (R5f+R5r)/(R5f−R5r) is preferably greater than −0.9. In such a case, it is easy to correct spherical aberration or longitudinal chromatic aberration. (R5f+R5r)/(R5f−R5r) is more preferably greater than −0.8, and still more preferably greater than −0.7. From the above, it is more preferable to satisfy at least one of Conditional Expressions (16-1) to (16-3).

$$-0.9<(R5f+R5r)/(R5f-R5r)<-0.1 \quad (16\text{-}1)$$

$$-0.8<(R5f+R5r)/(R5f-R5r)<-0.2 \quad (16\text{-}2)$$

$$-0.7<(R5f+R5r)/(R5f-R5r)<-0.3 \quad (16\text{-}3)$$

By not allowing the result of Conditional Expression (17) to be equal to or less than the lower limit, it is easy to correct longitudinal chromatic aberration. vd1 is more preferably greater than 35, still more preferably greater than 38, and still more preferably greater than 40. Further, vd1 is preferably smaller than 85, and in such a case, it is easy to reduce the cost and it is easy to select a material having a high refractive index, so that there is an advantage in correcting distortion and increasing the angle of view. In a case where vd1 is configured to be smaller than 85, it is easy to select a material having high chemical resistance, and it is easy to manufacture a highly reliable lens. Since the first lens L1 is a lens closest to the object side and may be exposed to the outside, it is effective to select a material having high chemical resistance. vd1 is more preferably smaller than 80, still more preferably smaller than 60, and still more preferably smaller than 50. From the above, it is more preferable to satisfy at least one of Conditional Expressions (17-1) to (17-3).

$$30<vd1<85 \quad (17\text{-}1)$$

$$35<vd1<60 \quad (17\text{-}2)$$

$$38<vd1<50 \quad (17\text{-}3)$$

By not allowing the result of Conditional Expression (18) to be equal to or less than the lower limit, it is easy to correct longitudinal chromatic aberration. vd2 is more preferably greater than 35, still more preferably greater than 38, and still more preferably greater than 40. Further, vd2 is preferably smaller than 85, and in such a case, it is easy to reduce the cost and it is easy to select a material having a high refractive index, so that there is an advantage in correcting distortion and increasing the angle of view. vd2 is more preferably smaller than 80, still more preferably smaller than 60, and still more preferably smaller than 50. From the above, it is more preferable to satisfy at least one of Conditional Expressions (18-1) to (18-3).

$$30<vd2<85 \quad (18\text{-}1)$$

$$35<vd2<60 \quad (18\text{-}2)$$

$$38<vd2<50 \quad (18\text{-}3)$$

By not allowing the result of Conditional Expression (19) to be equal to or less than the lower limit, it is easy to correct longitudinal chromatic aberration. vd3 is more preferably greater than 40, still more preferably greater than 45, and still more preferably greater than 50. Further, vd3 is preferably smaller than 85, and in such a case, it is easy to suppress lateral chromatic aberration. vd3 is more preferably smaller than 80, still more preferably smaller than 70, and still more preferably smaller than 60. From the above, it is more preferable to satisfy at least one of Conditional Expressions (19-1) to (19-3).

$$30<vd3<85 \quad (19\text{-}1)$$

$$40<vd3<70 \quad (19\text{-}2)$$

$$45<vd3<60 \quad (19\text{-}3)$$

By not allowing the result of Conditional Expression (20) to be equal to or less than the lower limit, it is easy to correct longitudinal chromatic aberration. vd4 is more preferably greater than 40, still more preferably greater than 45, and still more preferably greater than 50. Further, vd4 is preferably smaller than 85, and in such a case, it is easy to suppress lateral chromatic aberration. vd4 is more preferably smaller than 80, still more preferably smaller than 70, still more preferably smaller than 60, and still more preferably smaller than 55. From the above, it is more preferable to satisfy at least one of Conditional Expressions (20-1) to (20-3).

$$30<vd4<85 \quad (20\text{-}1)$$

$$40<vd4<70 \quad (20\text{-}2)$$

$$45<vd4<60 \quad (20\text{-}3)$$

By not allowing the result of Conditional Expression (21) to be equal to or less than the lower limit, it is easy to correct longitudinal chromatic aberration and lateral chromatic aberration. vd6 is more preferably greater than 25, still more preferably greater than 30, and still more preferably greater than 33. Further, vd6 is preferably smaller than 85, and in such a case, it is easy to reduce a cost of a material. vd6 is more preferably smaller than 80, still more preferably smaller than 70, still more preferably smaller than 60, still more preferably smaller than 50, and still more preferably smaller than 40. From the above, it is more preferable to satisfy at least one of Conditional Expressions (21-1) to (21-3).

$$20<vd6<85 \quad (21\text{-}1)$$

$$25<vd6<60 \quad (21\text{-}2)$$

$$30<vd6<50 \quad (21\text{-}3)$$

By not allowing the result of Conditional Expression (22) to be equal to or less than the lower limit, it is easy to correct longitudinal chromatic aberration and lateral chromatic aberration. vd7 is more preferably greater than 35, still more preferably greater than 38, and still more preferably greater than 40. Further, vd7 is preferably smaller than 85, and in such a case, it is easy to reduce a cost of a material. vd7 is more preferably smaller than 80, still more preferably smaller than 70, still more preferably smaller than 60, and still more preferably smaller than 50. From the above, it is more preferable to satisfy at least one of Conditional Expressions (22-1) to (22-3).

$$30<vd7<85 \quad (22\text{-}1)$$

$$35<vd7<60 \quad (22\text{-}2)$$

$$38<vd7<50 \quad (22\text{-}3)$$

By not allowing the result of Conditional Expression (23) to be equal to or greater than the upper limit, it is easy to correct longitudinal chromatic aberration and lateral chromatic aberration. vd8 is more preferably smaller than 23, still more preferably smaller than 21, still more preferably smaller than 20, still more preferably smaller than 19, and still more preferably smaller than 18. Further, vd8 is preferably greater than 16, and in such a case, it is easy to reduce a cost of a material. vd8 is more preferably greater than 17, and still more preferably greater than 17.2. From the above, it is more preferable to satisfy at least one of Conditional Expressions (23-1) to (23-3).

$16 < vd8 < 23$ (23-1)

$16 < vd8 < 21$ (23-2)

$17.2 < vd8 < 19$ (23-3)

A preferable configuration relating to the conditional expression is not limited to a configuration satisfying the range described in the above expression, and includes a configuration satisfying a range obtained by randomly combining the preferable lower limit and the preferable upper limit described above for each conditional expression.

Here, three preferable configuration examples in consideration of the above-described conditional expressions and effects thereof will be described. A first configuration example is an imaging lens that has the basic configuration described above and satisfies Conditional Expression (1). According to the first configuration example, there is an advantage in configuring a lens system having a small F-number while satisfactorily correcting various aberrations, particularly longitudinal chromatic aberration.

A second configuration example is an imaging lens that has the basic configuration described above and satisfies Conditional Expression (2). According to the second configuration example, there is an advantage in reducing the size of a lens system while satisfactorily correcting various aberrations, particularly distortion and spherical aberration.

A third configuration example is an imaging lens that has the basic configuration described above and satisfies Conditional Expression (3). According to the third configuration example, there is an advantage in satisfactorily correcting various aberrations, particularly chromatic aberration and spherical aberration.

Although FIG. 1 shows an example in which the optical member PP is disposed between the lens system and the image plane Sim, instead of disposing various filters between the lens system and the image plane Sim, various filters may be disposed between the respective lenses, or coating having the same effect as the various filters may be applied to the lens surface of any of the lenses.

The imaging lens 1 may have a function of performing focusing according to a change in object distance. In a case where this function is provided, focusing may be performed by moving the entire lens system, or focusing may be performed by moving only a part of the lens system.

Further, the F-number of the imaging lens 1 is preferably 2.0 or less. By setting the F-number to 2.0 or less, favorable imaging can be performed even in a dark place. The F-number is more preferably 1.8 or less, still more preferably 1.5 or less, and still more preferably 1.2 or less.

In addition, a light shielding member such as a stop for shielding a part of the marginal rays may be disposed between the respective lenses as long as no practical problem regarding the peripheral light amount ratio occurs. With such a member, it is possible to improve the image quality in the peripheral portion of the image formation area. FIG. 1 shows an example in which a light shielding member 11 and a light shielding member 12 are provided so as to contact the peripheral portions of the object side surface of the third lens L3 and the image side surface of the seventh lens L7, respectively. Each of the light shielding member 11 and the light shielding member 12 has a circular opening centered on the optical axis. The locations where the light shielding members are provided and the number of the light shielding members are not limited to the example shown in FIG. 1.

Furthermore, there is a concern that rays passing through the outside of the effective diameter between the respective lenses may reach the image plane as stray light, thereby causing a ghost image. Therefore, a light shielding member for shielding the stray light may be provided as necessary. The stray light shielding member may be, for example, an opaque coating material applied to a portion of the lens in the outside the effective diameter or an opaque plate material, and may be disposed between any of the lenses as necessary.

The above-described preferable configurations and possible configurations may be combined in any manner and are preferably selected, as appropriate, in accordance with required specifications. By appropriately selecting the preferable configuration, it is possible to realize an optical system having more favorable optical performance and/or being capable of meeting higher specifications. According to the technique of the present disclosure, it is possible to realize an imaging lens that has a small F-number and has high optical performance by satisfactorily correcting various aberrations. In addition, the term "small F-number" as used herein means that the F-number is 2.0 or less.

Next, numerical examples of the imaging lens of the embodiment of the present invention will be described.

Example 1

FIG. 1 shows a cross-sectional view of a configuration and optical paths of the imaging lens of Example 1. The illustration method and configuration are as described above, and thus, some redundant parts thereof will not be described.

Regarding the imaging lens of Example 1, Table 1 shows basic lens data, Table 2 shows values and specifications relating to the conditional expressions, and Table 3 shows aspherical surface coefficients. In Table 1, the column of Sn shows surface numbers in a case where the surface closest to the object side is the first surface and the surface numbers increase one by one toward the image side, the column of R shows radii of curvature of the respective surfaces, and the column of D shows surface distances on the optical axis between the respective surfaces and the surface adjacent to the image side. Further, the column of Nd shows refractive indices of the respective components at the d line, and the column of vd shows Abbe numbers of the respective components at the d line. In the row of the surface on which the light shielding member for shielding a part of the marginal rays is disposed, the diameter of the opening of the light shielding member is added with φ and shown in the column labeled the light shielding member.

In Table 1, signs of radii of curvature of surface shapes convex toward the object side are set to be positive, and signs of radii of curvature of surface shapes convex toward the image side are set to be negative. Table 1 also shows the aperture stop St and the optical member PP. In Table 1, in a place of a surface number of a surface corresponding to the aperture stop St, the surface number and a term of (St) are noted. The surface at the bottom place of Table 1 is the image plane Sim.

In Table 2, FNo. is the F-number, and 2ω is the maximum total angle of view. Table 2 also shows corresponding values of the symbols used in the conditional expressions described above.

In Table 1, the reference sign * is attached to surface numbers of aspherical surfaces, and numerical values of the paraxial radius of curvature are written into the column of the radius of curvature of the aspherical surface. In Table 3, the row of Sn shows surface numbers of the aspherical surfaces, and the rows of KA and Am (m=3, 4, 5, 6) show numerical values of the aspherical surface coefficients for each aspherical surface. The "E±n" (n: integer) in numerical values of the aspherical surface coefficients in Table 3 indicates "×10$^{±n}$". KA and Am are the aspherical surface coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd: an aspherical surface depth (a length of a perpendicular from a point on an aspherical surface at height h to a plane that is perpendicular to the optical axis and contacts with the vertex of the aspherical surface), h: a height (a distance from the optical axis to the lens surface), C: a reciprocal of paraxial radius of curvature, KA, Am: aspherical surface coefficient, and Σ in the aspherical surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | νd | Light shielding member |
|---|---|---|---|---|---|
| 1 | 76.53351 | 2.00000 | 1.83481 | 42.7 | |
| 2 | 25.97218 | 6.48940 | | | |
| 3 | 582.21683 | 3.00000 | 1.72000 | 50.2 | |
| 4 | 41.34847 | 26.89825 | | | |
| 5 | 210.53601 | 20.00000 | 1.58313 | 59.4 | Φ46 |
| 6 | −48.58360 | 0.50000 | | | |
| 7 | 48.98875 | 10.00000 | 1.75500 | 52.3 | |
| 8 | −3167.61343 | 5.00000 | | | |
| 9(St) | ∞ | 22.63881 | | | |
| 10 | −22.30331 | 3.00000 | 1.95906 | 17.5 | |
| 11 | 73.88613 | 3.00000 | | | |
| 12 | 98.52309 | 10.00000 | 1.80100 | 35.0 | |
| 13 | −30.25892 | 0.10000 | | | |
| *14 | 43.48329 | 8.00000 | 1.69350 | 53.2 | |
| *15 | −42.51341 | 1.71479 | | | Φ30 |
| 16 | −65.69558 | 2.00000 | 1.95906 | 17.5 | |
| 17 | −90.68973 | 15.00000 | | | |
| 18 | ∞ | 3.60000 | 1.51680 | 64.2 | |
| 19 | ∞ | 2.50831 | | | |
| 20 | ∞ | | | | |

TABLE 2

Example 1

| f | 16.4 |
|---|---|
| FNo. | 0.97 |
| 2ω | 58.2 |
| ED8r | 27.99 |
| TL | 144.22 |
| Bf | 19.88 |
| f1 | −48.0 |
| f12 | −25.2 |
| f23 | 145.8 |
| f45 | −88.1 |
| f456 | 129.0 |
| f6 | 29.9 |
| f7 | 32.2 |

TABLE 3

Example 1

| Sn | 14 | 15 |
|---|---|---|
| KA | 1.0000000E+00 | 1.0000000E+00 |
| A3 | 9.0694535E−06 | 1.5152694E−06 |
| A4 | −8.9190205E−06 | 5.0008283E−06 |
| A5 | 1.3947544E−07 | −2.2459410E−07 |
| A6 | −7.8986724E−09 | 6.3532621E−09 |

Figure 10:
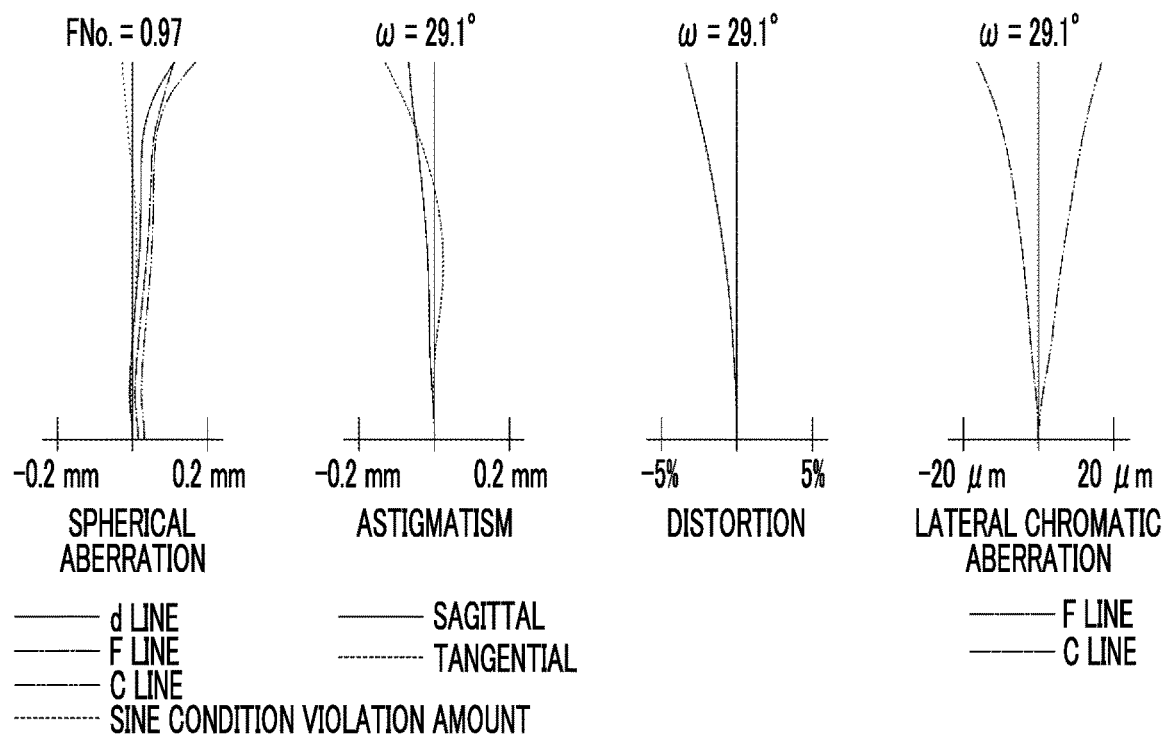
FIG. 10 is a diagram of aberrations of the imaging lens of Example 1 of the present invention.

FIG. 10 shows aberration diagrams of the imaging lens of Example 1 in a case where an object distance is infinity. FIG. 10 shows, in order from the left, spherical aberration, astigmatism, distortion, and lateral chromatic aberration. In the spherical aberration diagram, aberrations at the d line, F line, and C line are indicated by a solid line, a one-dot chain line, and a two-dot chain line, respectively. In the spherical aberration diagram, a sine condition violation amount is indicated by a dashed line. In the astigmatism diagram, aberration at the d line in the sagittal direction is indicated by a solid line, and aberration at the d line in the tangential direction is indicated by a short dashed line. In the distortion diagram, aberration at the d line is indicated by a solid line. In the lateral chromatic aberration diagram, aberrations at the F line and the C line are indicated by a one-dot chain line and a two-dot chain line, respectively. In the spherical aberration diagram, FNo. indicates an F-number, and in the other aberration diagrams, ω indicates a half angle of view.

Symbols, meanings, and description methods of the respective data pieces according to Example 1 are the same as those in the following examples unless otherwise noted. Therefore, in the following description, repeated description will be omitted.

Example 2

Figure 2:
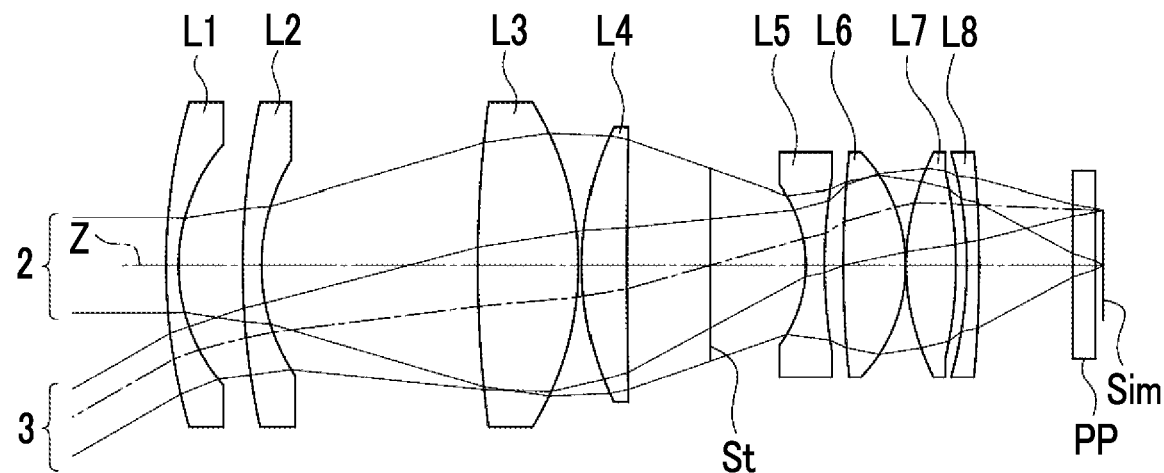
FIG. 2 is a cross-sectional view showing a configuration of an imaging lens of Example 2 of the present invention.

FIG. 2 shows a cross-sectional view of a configuration and optical paths of the imaging lens of Example 2. FIG. 2 is different from FIG. 1 in that the illustration of rays 4 with the maximum angle of view and the light shielding member is omitted, but the other illustration methods are basically the same as those in FIG. 1. The cross-sectional views according to Examples 3 to 9 below also employ the same illustration method as in FIG. 2.

Figure 11:
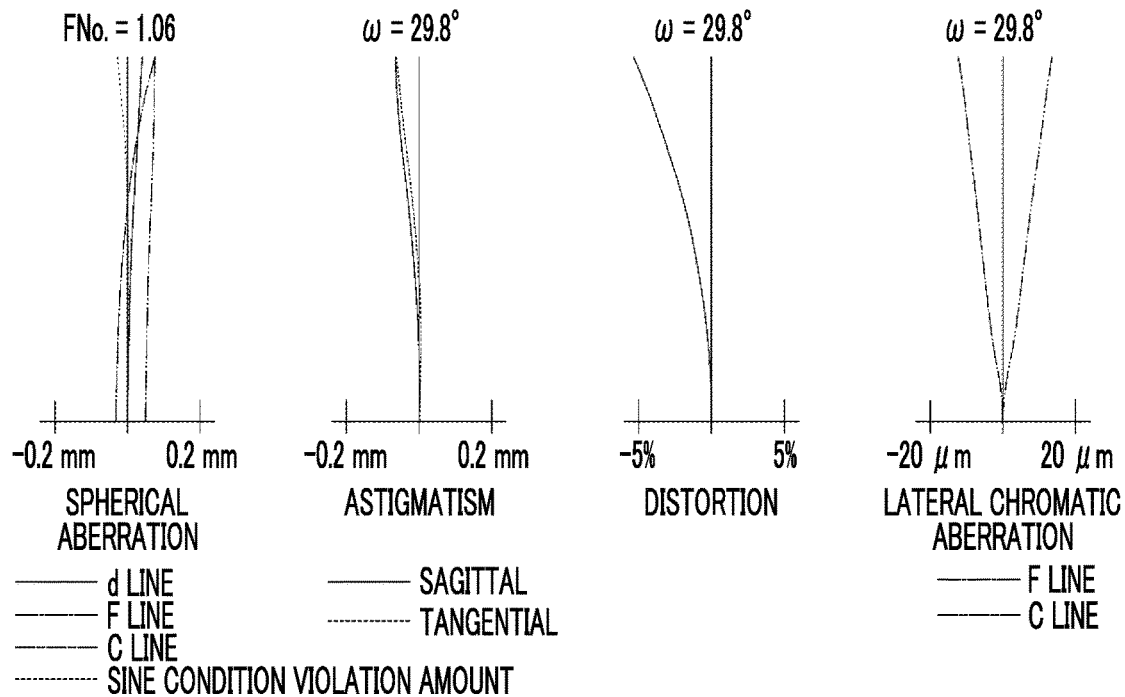
FIG. 11 is a diagram of aberrations of the imaging lens of Example 2 of the present invention.

The imaging lens of Example 2 comprises only eight lenses consisting of, in order from the object side to the image side, the first lens L1 to the eighth lens L8 as lenses having refractive powers, and has the basic configuration described above. Regarding the imaging lens of Example 2, Table 4 shows basic lens data, Table 5 shows values and specifications relating to the conditional expressions, Table 6 shows aspherical surface coefficients, and FIG. 11 shows aberration diagrams.

TABLE 4

Example 2

| Sn | R | D | Nd | νd | Light shielding member |
|---|---|---|---|---|---|
| 1 | 92.94720 | 2.00000 | 1.83481 | 42.7 | |
| 2 | 29.46690 | 10.27896 | | | |
| 3 | 123.44667 | 3.00000 | 1.49700 | 81.5 | |
| 4 | 31.81477 | 34.64275 | | | |
| 5 | 196.66333 | 16.16200 | 1.58313 | 59.4 | Φ40 |
| 6 | −49.56482 | 0.50000 | | | |

TABLE 4-continued

Example 2

| Sn | R | D | Nd | vd | Light shielding member |
|---|---|---|---|---|---|
| 7 | 50.24087 | 7.12352 | 1.71300 | 53.9 | |
| 8 | 896.72612 | 13.31721 | | | Φ40 |
| 9(St) | ∞ | 15.33339 | | | |
| 10 | −21.54132 | 3.00000 | 1.95906 | 17.5 | |
| 11 | 81.40668 | 3.00000 | | | |
| 12 | 172.11764 | 10.00000 | 1.80100 | 35.0 | |
| 13 | −26.16021 | 0.10000 | | | |
| *14 | 36.14047 | 8.00000 | 1.80610 | 40.9 | |
| *15 | −63.78049 | 1.71479 | | | Φ30 |
| 16 | −65.60343 | 2.00000 | 1.95906 | 17.5 | |
| 17 | −194.83998 | 15.00000 | | | |
| 18 | ∞ | 3.60000 | 1.51680 | 64.2 | |
| 19 | ∞ | 1.24704 | | | |
| 20 | ∞ | | | | |

TABLE 5

Example 2

| | |
|---|---|
| f | 16.2 |
| FNo. | 1.06 |
| 2ω | 59.7 |
| ED8r | 27.70 |
| TL | 148.79 |
| Bf | 18.62 |
| f1 | −52.4 |
| f12 | −30.1 |
| f23 | 101.2 |
| f45 | −55.4 |
| f456 | 150.5 |
| f6 | 29.0 |
| f7 | 29.7 |

TABLE 6

Example 2

| Sn | 14 | 15 |
|---|---|---|
| KA | 1.0000000E+00 | 1.0000000E+00 |
| A3 | −1.7900418E−07 | 1.6944014E−06 |
| A4 | −2.2606503E−06 | 3.0543843E−06 |
| A5 | −9.6397820E−08 | −2.0263464E−07 |
| A6 | 1.1971687E−09 | 6.9299864E−09 |

Example 3

Figure 3:
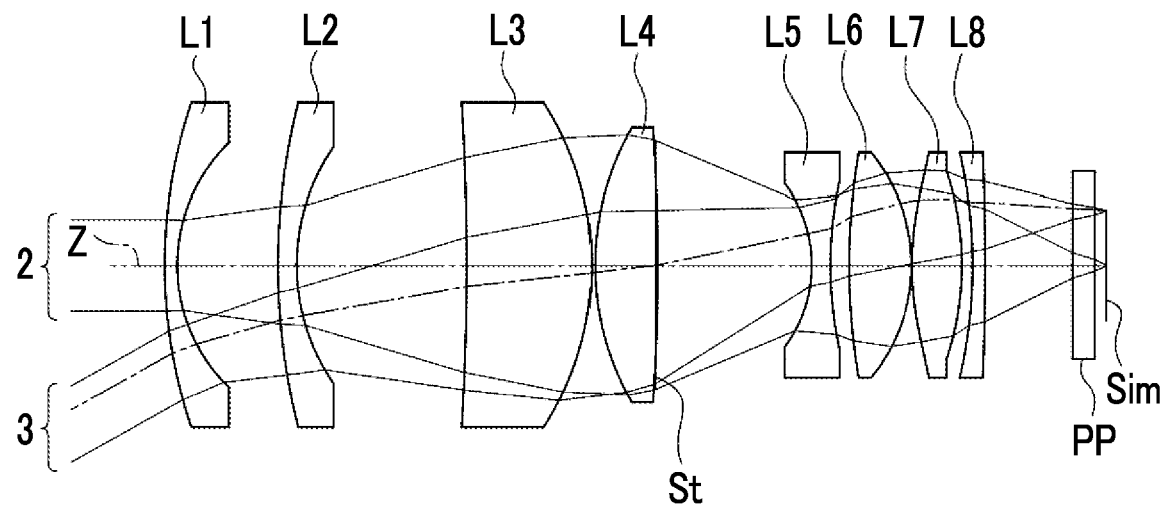
FIG. 3 is a cross-sectional view showing a configuration of an imaging lens of Example 3 of the present invention.
Figure 12:
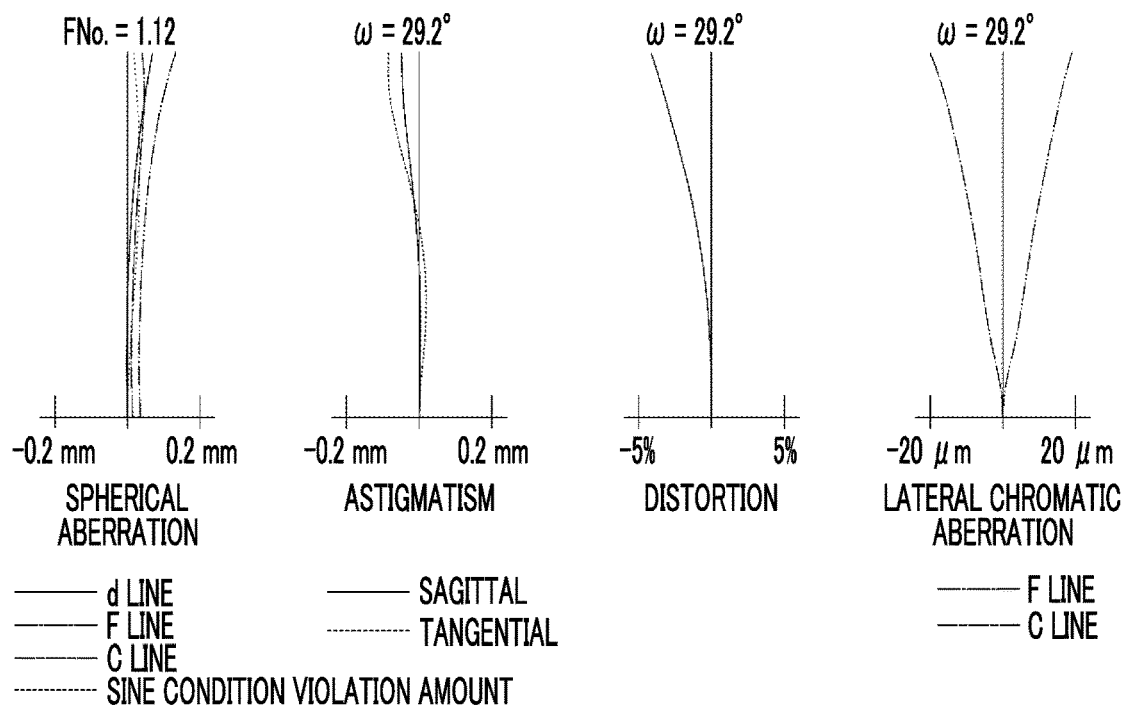
FIG. 12 is a diagram of aberrations of the imaging lens of Example 3 of the present invention.

FIG. 3 shows a cross-sectional view of a configuration and optical paths of the imaging lens of Example 3. The imaging lens of Example 3 comprises only eight lenses consisting of, in order from the object side to the image side, the first lens L1 to the eighth lens L8 as lenses having refractive powers, and has the basic configuration described above. Regarding the imaging lens of Example 3, Table 7 shows basic lens data, Table 8 shows values and specifications relating to the conditional expressions, Table 9 shows aspherical surface coefficients, and FIG. 12 shows aberration diagrams.

TABLE 7

Example 3

| Sn | R | D | Nd | vd | Light shielding member |
|---|---|---|---|---|---|
| 1 | 81.52939 | 2.00000 | 1.73779 | 54.22 | |
| 2 | 27.26458 | 16.13348 | | | |
| 3 | 105.84028 | 3.00000 | 1.63163 | 34.88 | |
| 4 | 33.26965 | 27.21010 | | | |
| 5 | −428.92544 | 20.00000 | 1.58313 | 59.37 | Φ40 |
| 6 | −48.03573 | 0.50000 | | | |
| 7 | 44.10977 | 10.00000 | 1.75500 | 52.32 | |
| 8 | −318.91376 | −0.30786 | | | Φ40 |
| 9(St) | ∞ | 24.97128 | | | |
| 10 | −21.89029 | 3.00000 | 1.95906 | 17.47 | |
| 11 | 63.31814 | 3.00000 | | | |
| 12 | 107.30665 | 10.00000 | 1.80100 | 34.97 | |
| 13 | −28.19416 | 0.10000 | | | |
| *14 | 47.12377 | 8.00000 | 1.80610 | 40.93 | |
| *15 | −45.81782 | 1.71479 | | | Φ30 |
| 16 | −80.05048 | 2.00000 | 1.95906 | 17.47 | |
| 17 | −453.12967 | 14.00000 | | | |
| 18 | ∞ | 3.61667 | 1.51680 | 64.20 | |
| 19 | ∞ | 1.80313 | | | |
| 20 | ∞ | | | | |

TABLE 8

Example 3

| | |
|---|---|
| f | 16.4 |
| FNo. | 1.12 |
| 2ω | 58.4 |
| ED8r | 26.79 |
| TL | 149.50 |
| Bf | 18.18 |
| f1 | −56.4 |
| f12 | −28.8 |
| f23 | 259.5 |
| f45 | −168.1 |
| f456 | 96.0 |
| f6 | 28.8 |
| f7 | 30.0 |

TABLE 9

Example 3

| Sn | 14 | 15 |
|---|---|---|
| KA | 1.0000000E+00 | 1.0000000E+00 |
| A3 | 2.1745943E−05 | 3.0520880E−05 |
| A4 | −7.3733307E−06 | 1.6987087E−06 |
| A5 | 4.8455074E−08 | −2.5205726E−07 |
| A6 | −9.4311110E−09 | 6.4695736E−09 |

Example 4

Figure 4:
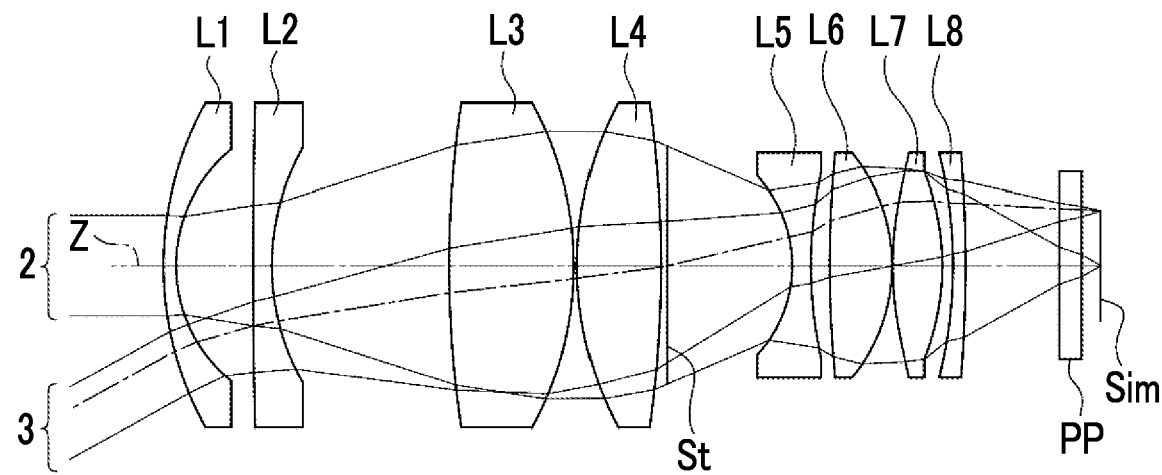
FIG. 4 is a cross-sectional view showing a configuration of an imaging lens of Example 4 of the present invention.
Figure 13:
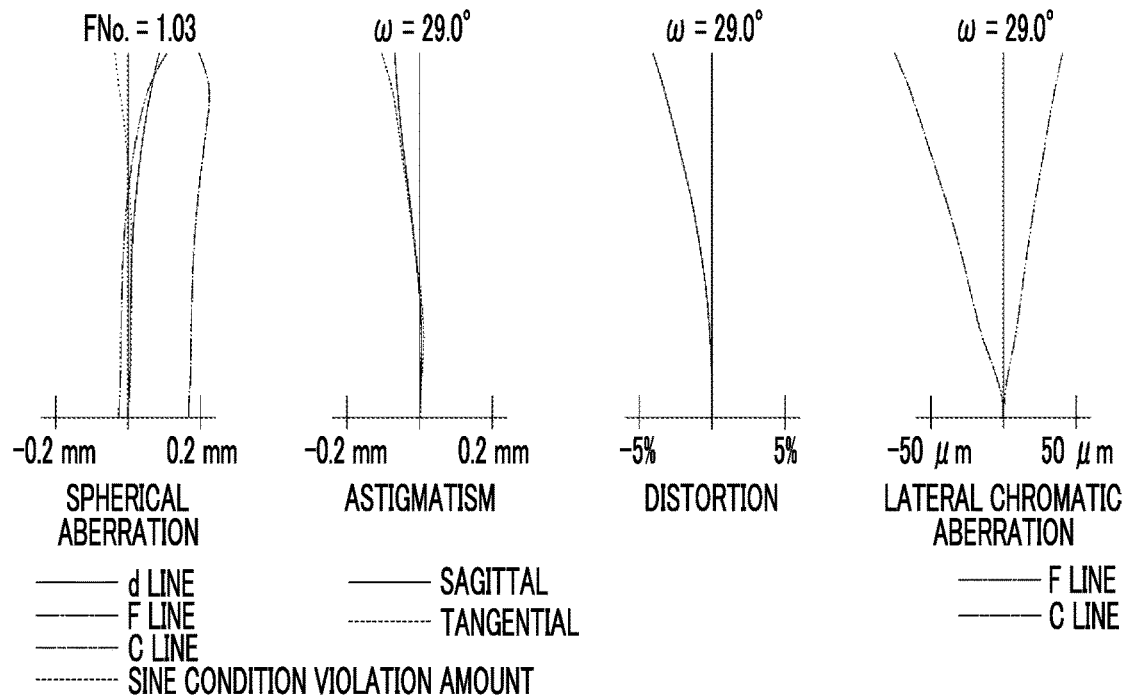
FIG. 13 is a diagram of aberrations of the imaging lens of Example 4 of the present invention.

FIG. 4 shows a cross-sectional view of a configuration and optical paths of the imaging lens of Example 4. The imaging lens of Example 4 comprises only eight lenses consisting of, in order from the object side to the image side, the first lens L1 to the eighth lens L8 as lenses having refractive powers, and has the basic configuration described above. Regarding the imaging lens of Example 4, Table 10 shows basic lens data, Table 11 shows values and specifications relating to the conditional expressions, Table 12 shows aspherical surface coefficients, and FIG. 13 shows aberration diagrams.

TABLE 10

Example 4

| Sn | R | D | Nd | vd | Light shielding member |
|---|---|---|---|---|---|
| 1 | 53.58920 | 2.00000 | 1.78800 | 47.4 | |
| 2 | 23.85607 | 12.34838 | | | |
| 3 | 1131.71835 | 3.00000 | 1.51680 | 64.2 | |
| 4 | 38.16222 | 28.38847 | | | |
| 5 | 173.87968 | 20.00000 | 1.58313 | 59.4 | Φ40 |
| 6 | −53.91883 | 0.50000 | | | |
| 7 | 54.96266 | 13.33122 | 1.75500 | 52.3 | |
| 8 | −187.02181 | 1.00000 | | | |
| 9(St) | ∞ | 20.00000 | | | |
| 10 | −21.10834 | 3.00000 | 1.95906 | 17.5 | |
| 11 | 68.21153 | 3.00000 | | | |
| 12 | 181.55923 | 10.00000 | 1.80100 | 35.0 | |
| 13 | −28.48193 | 0.10000 | | | |
| *14 | 51.01095 | 8.00000 | 1.80610 | 40.9 | |
| *15 | −38.72697 | 1.71479 | | | Φ30 |
| 16 | −73.63577 | 2.00000 | 1.95906 | 17.5 | |
| 17 | −227.70763 | 15.00000 | | | |
| 18 | ∞ | 3.60000 | 1.51680 | 64.2 | |
| 19 | ∞ | 3.05424 | | | |
| 20 | ∞ | | | | |

TABLE 11

Example 4

| | |
|---|---|
| f | 16.5 |
| FNo. | 1.03 |
| 2ω | 58 |
| ED8r | 27.00 |
| TL | 148.81 |
| Bf | 20.43 |
| f1 | −56.2 |
| f12 | −29.4 |
| f23 | 133.3 |
| f45 | −69.4 |
| f456 | 154.5 |
| f6 | 31.4 |
| f7 | 28.4 |

TABLE 12

Example 4

| Sn | 14 | 15 |
|---|---|---|
| KA | 1.0000000E+00 | 1.0000000E+00 |
| A3 | 9.1763838E−06 | 1.7526573E−05 |
| A4 | −5.0974125E−06 | 2.0947244E−06 |
| A5 | −7.5450510E−08 | −4.1101912E−08 |
| A6 | 5.0458251E−10 | 1.2250383E−09 |

TABLE 13

Example 5

| Sn | R | D | Nd | vd | Light shielding member |
|---|---|---|---|---|---|
| 1 | 100.58172 | 2.00000 | 1.83481 | 42.7 | |
| 2 | 29.20447 | 17.32940 | | | |
| 3 | 102.49622 | 3.00000 | 1.72000 | 50.2 | |
| 4 | 35.37128 | 26.61800 | | | |
| 5 | 684.22791 | 20.00000 | 1.58313 | 59.4 | Φ46 |
| 6 | −49.11435 | 0.50000 | | | |
| 7 | 45.57082 | 10.00000 | 1.75500 | 52.3 | |
| 8 | −411.05153 | 0.00000 | | | |
| 9(St) | ∞ | 24.77680 | | | |
| 10 | −22.94586 | 3.00000 | 1.95906 | 17.5 | |
| 11 | 71.12187 | 3.00000 | | | |
| 12 | 105.94925 | 10.00000 | 1.80100 | 35.0 | |
| 13 | −28.52410 | 0.10000 | | | |
| *14 | 47.06154 | 8.00000 | 1.69350 | 53.2 | |
| *15 | −45.15446 | 1.71479 | | | Φ30 |
| 16 | −74.36116 | 2.00000 | 1.95906 | 17.5 | |
| 17 | −148.96284 | 15.00000 | | | |
| 18 | ∞ | 3.60000 | 1.51680 | 64.2 | |
| 19 | ∞ | 0.60650 | | | |
| 20 | ∞ | | | | |

TABLE 14

Example 5

| | |
|---|---|
| f | 16.0 |
| FNo. | 1.02 |
| 2ω | 59.9 |
| ED8r | 27.35 |
| TL | 150.02 |
| Bf | 17.98 |
| f1 | −49.9 |
| f12 | −26.2 |
| f23 | 175.1 |
| f45 | −145.4 |
| f456 | 94.4 |
| f6 | 29.0 |
| f7 | 34.5 |

TABLE 15

Example 5

| Sn | 14 | 15 |
|---|---|---|
| KA | 1.0000000E+00 | 1.0000000E+00 |
| A3 | 2.5120812E−05 | 3.1649914E−05 |
| A4 | −9.6032632E−06 | 2.5152374E−06 |
| A5 | 7.5164434E−08 | −3.3150440E−07 |
| A6 | −9.4767507E−09 | 9.9806920E−09 |

Example 5

Figure 5:
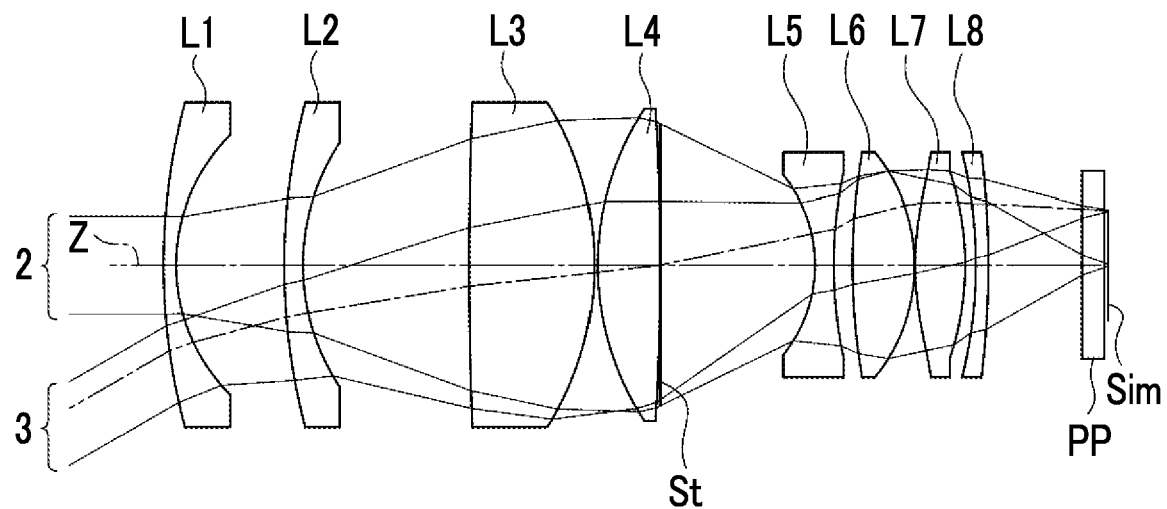
FIG. 5 is a cross-sectional view showing a configuration of an imaging lens of Example 5 of the present invention.
Figure 14:
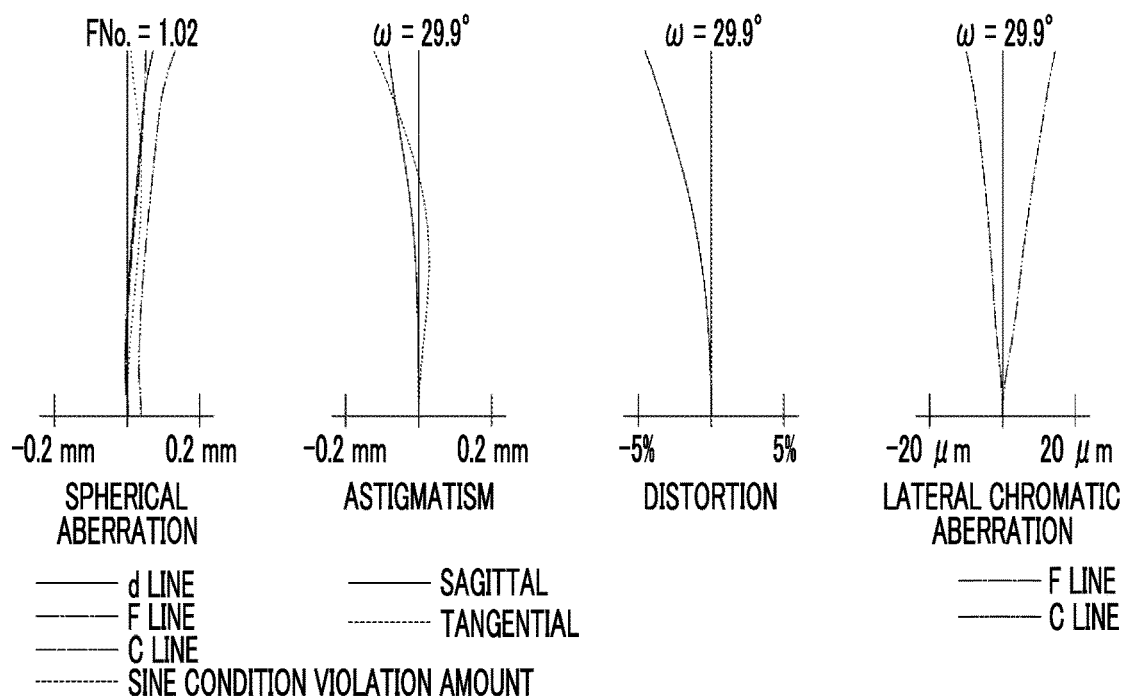
FIG. 14 is a diagram of aberrations of the imaging lens of Example 5 of the present invention.

FIG. 5 shows a cross-sectional view of a configuration and optical paths of the imaging lens of Example 5. The imaging lens of Example 5 comprises only eight lenses consisting of, in order from the object side to the image side, the first lens L1 to the eighth lens L8 as lenses having refractive powers, and has the basic configuration described above. Regarding the imaging lens of Example 5, Table 13 shows basic lens data, Table 14 shows values and specifications relating to the conditional expressions, Table 15 shows aspherical surface coefficients, and FIG. 14 shows aberration diagrams.

Example 6

Figure 6:
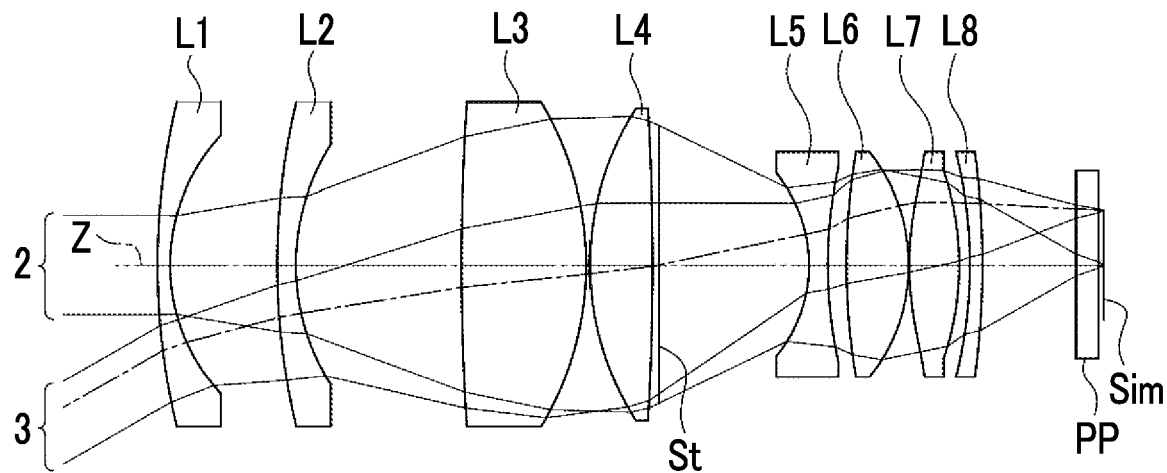
FIG. 6 is a cross-sectional view showing a configuration of an imaging lens of Example 6 of the present invention.
Figure 15:
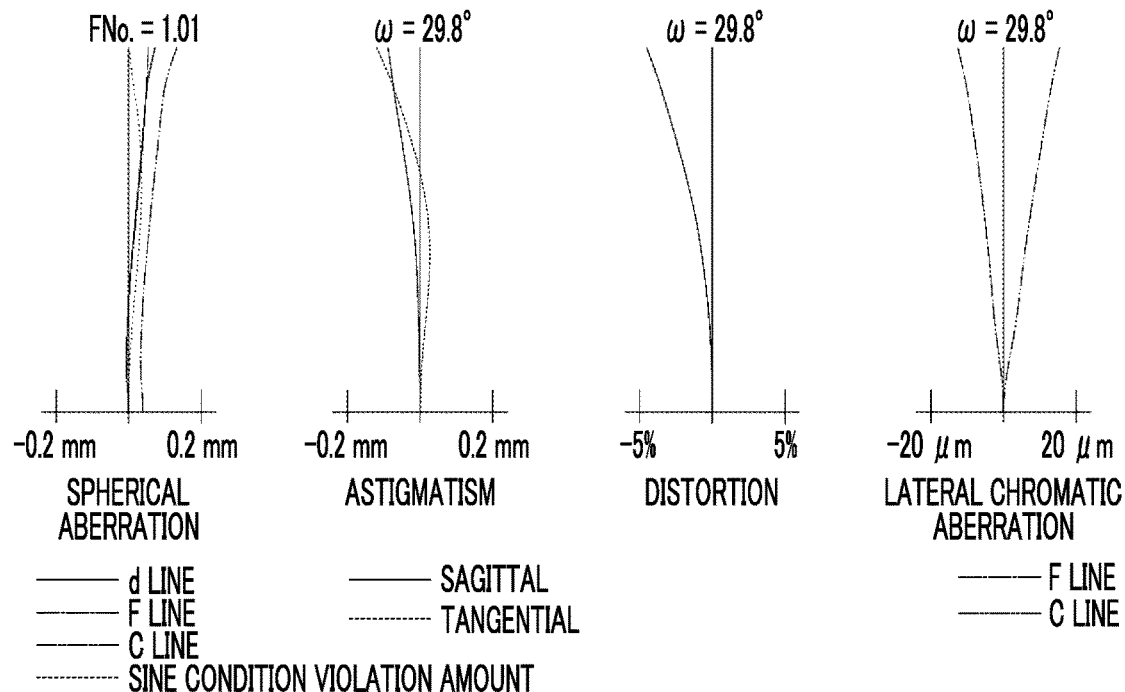
FIG. 15 is a diagram of aberrations of the imaging lens of Example 6 of the present invention.

FIG. 6 shows a cross-sectional view of a configuration and optical paths of the imaging lens of Example 6. The imaging lens of Example 6 comprises only eight lenses consisting of, in order from the object side to the image side, the first lens L1 to the eighth lens L8 as lenses having refractive powers, and has the basic configuration described above. Regarding the imaging lens of Example 6, Table 16 shows basic lens data, Table 17 shows values and specifications relating to the conditional expressions, Table 18 shows aspherical surface coefficients, and FIG. 15 shows aberration diagrams.

TABLE 16

Example 6

| Sn | R | D | Nd | vd | Light shielding member |
|---|---|---|---|---|---|
| 1 | 111.35873 | 2.00000 | 1.83481 | 42.7 | |
| 2 | 30.30454 | 17.15115 | | | |
| 3 | 111.79664 | 3.00000 | 1.72000 | 50.2 | |
| 4 | 35.82390 | 26.52289 | | | |
| 5 | 393.56309 | 20.00000 | 1.58313 | 59.4 | Φ46 |
| 6 | −50.39287 | 0.50000 | | | |
| 7 | 46.19999 | 10.00000 | 1.75500 | 52.3 | |
| 8 | −428.58955 | 0.00000 | | | Φ46 |
| 9(St) | ∞ | 24.05787 | | | |
| 10 | −23.00865 | 3.00000 | 1.95906 | 17.5 | |
| 11 | 72.14696 | 3.00000 | | | |
| 12 | 107.62453 | 10.00000 | 1.80100 | 35.0 | |
| 13 | −28.76997 | 0.10000 | | | |
| *14 | 47.44473 | 8.00000 | 1.69350 | 53.2 | |
| *15 | −44.86693 | 1.71479 | | | Φ30 |
| 16 | −73.65098 | 2.00000 | 1.95906 | 17.5 | |
| 17 | −134.28237 | 15.00000 | | | |
| 18 | ∞ | 3.60000 | 1.51680 | 64.2 | |
| 19 | ∞ | 0.78445 | | | |
| 20 | ∞ | | | | |

TABLE 17

Example 6

| f | 16.1 |
|---|---|
| FNo. | 1.01 |
| 2ω | 59.7 |
| ED8r | 27.44 |
| TL | 150.20 |
| Bf | 18.16 |
| f1 | −50.4 |
| f12 | −26.0 |
| f23 | 172.5 |
| f45 | −138.4 |
| f456 | 97.1 |
| f6 | 29.3 |
| f7 | 34.5 |

TABLE 18

Example 6

| Sn | 14 | 15 |
|---|---|---|
| KA | 1.0000000E+00 | 1.0000000E+00 |
| A3 | 2.3226107E−05 | 2.8188522E−05 |
| A4 | −9.6168644E−06 | 2.5051704E−06 |
| A5 | 6.0244248E−08 | −3.2854021E−07 |
| A6 | −9.2446660E−09 | 9.2309190E−09 |

TABLE 19

Example 7

| Sn | R | D | Nd | vd | Light shielding member |
|---|---|---|---|---|---|
| 1 | 75.05240 | 2.00000 | 1.83481 | 42.7 | |
| 2 | 28.22565 | 17.55551 | | | |
| 3 | 107.13030 | 3.00000 | 1.72000 | 50.2 | |
| 4 | 35.00313 | 27.33051 | | | |
| 5 | −911.14159 | 20.00000 | 1.58313 | 59.4 | Φ44 |
| 6 | −49.25788 | 0.50000 | | | |
| 7 | 44.45397 | 10.00000 | 1.75500 | 52.3 | |
| 8 | −340.20984 | 5.00000 | | | Φ44 |
| 9(St) | ∞ | 19.28474 | | | |
| 10 | −22.25556 | 3.00000 | 1.95906 | 17.5 | |
| 11 | 63.38986 | 3.00000 | | | |
| 12 | 105.99715 | 10.00000 | 1.80100 | 35.0 | |
| 13 | −28.08107 | 0.10000 | | | |
| *14 | 47.19878 | 8.00000 | 1.80610 | 40.9 | |
| *15 | −46.08482 | 1.71479 | | | Φ30 |
| 16 | −75.14689 | 2.00000 | 1.92286 | 18.9 | |
| 17 | −751.51015 | 15.00000 | | | |
| 18 | ∞ | 3.60000 | 1.51680 | 64.2 | |
| 19 | ∞ | 1.48329 | | | |
| 20 | ∞ | | | | |

TABLE 20

Example 7

| f | 15.9 |
|---|---|
| FNo. | 1.04 |
| 2ω | 60.2 |
| ED8r | 26.77 |
| TL | 151.34 |
| Bf | 18.86 |
| f1 | −55.3 |
| f12 | −27.4 |
| f23 | 263.9 |
| f45 | −148.1 |
| f456 | 95.7 |
| f6 | 28.7 |
| f7 | 30.1 |

TABLE 21

Example 7

| Sn | 14 | 15 |
|---|---|---|
| KA | 1.0000000E+00 | 1.0000000E+00 |
| A3 | 2.4939548E−05 | 3.1815021E−05 |
| A4 | −7.3711863E−06 | 2.1685763E−06 |
| A5 | 9.0756863E−08 | −2.3655640E−07 |
| A6 | −8.0135020E−09 | 7.3563125E−09 |

Example 7

Figure 7:
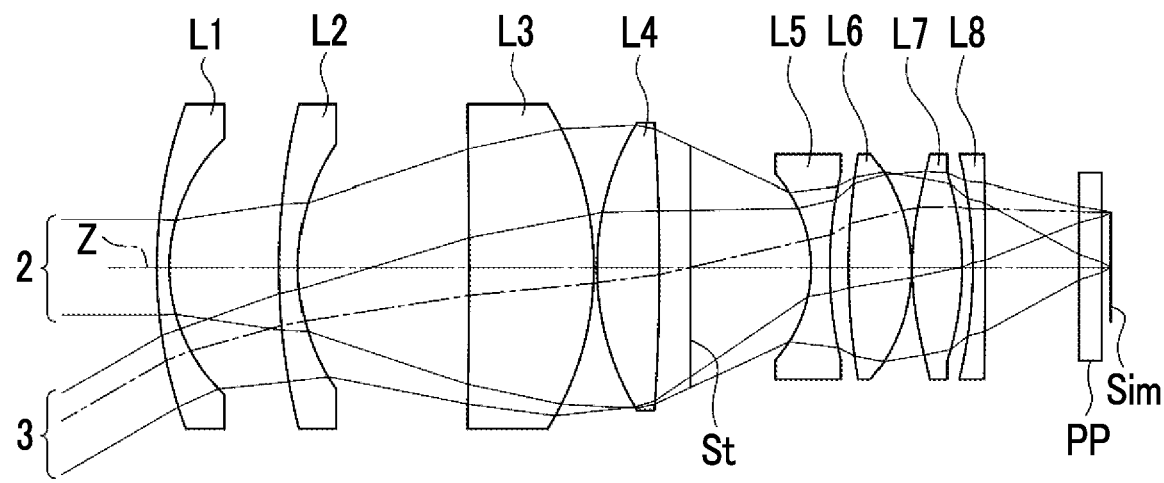
FIG. 7 is a cross-sectional view showing a configuration of an imaging lens of Example 7 of the present invention.
Figure 16:
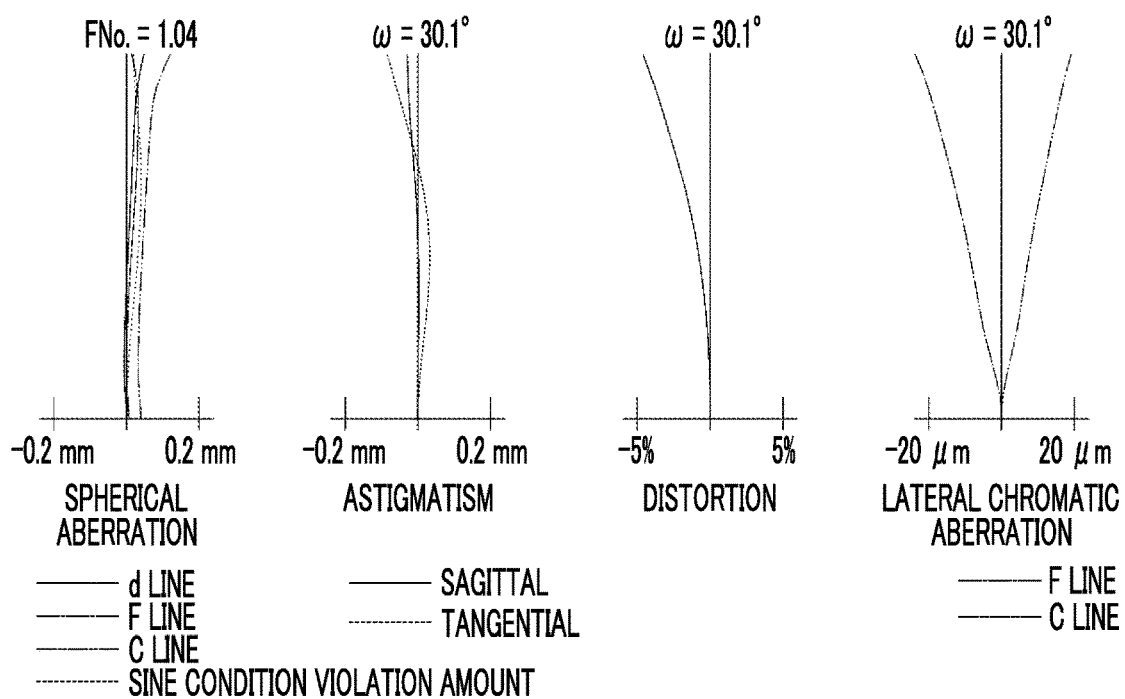
FIG. 16 is a diagram of aberrations of the imaging lens of Example 7 of the present invention.

FIG. 7 shows a cross-sectional view of a configuration and optical paths of the imaging lens of Example 7. The imaging lens of Example 7 comprises only eight lenses consisting of, in order from the object side to the image side, the first lens L1 to the eighth lens L8 as lenses having refractive powers, and has the basic configuration described above. Regarding the imaging lens of Example 7, Table 19 shows basic lens data, Table 20 shows values and specifications relating to the conditional expressions, Table 21 shows aspherical surface coefficients, and FIG. 16 shows aberration diagrams.

Example 8

Figure 8:
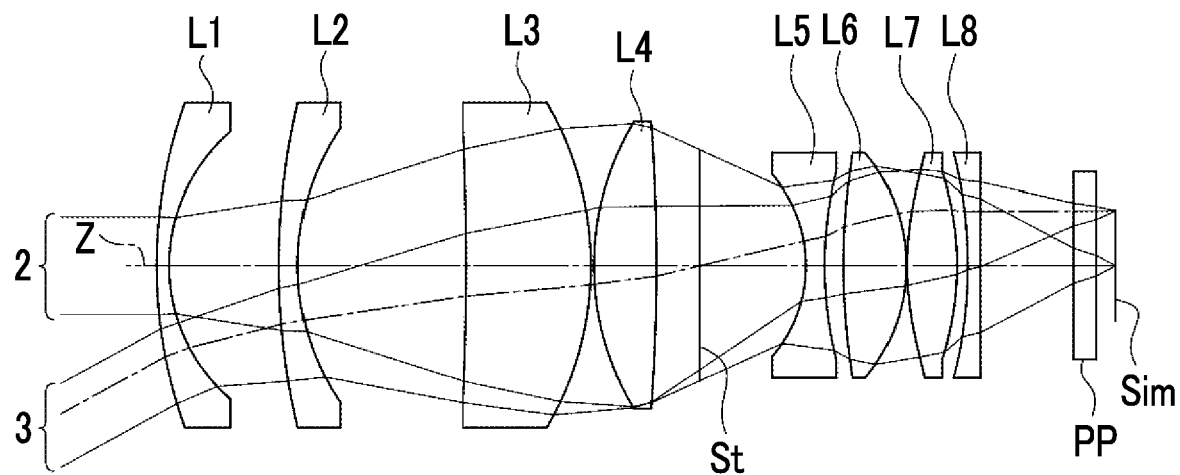
FIG. 8 is a cross-sectional view showing a configuration of an imaging lens of Example 8 of the present invention.
Figure 17:
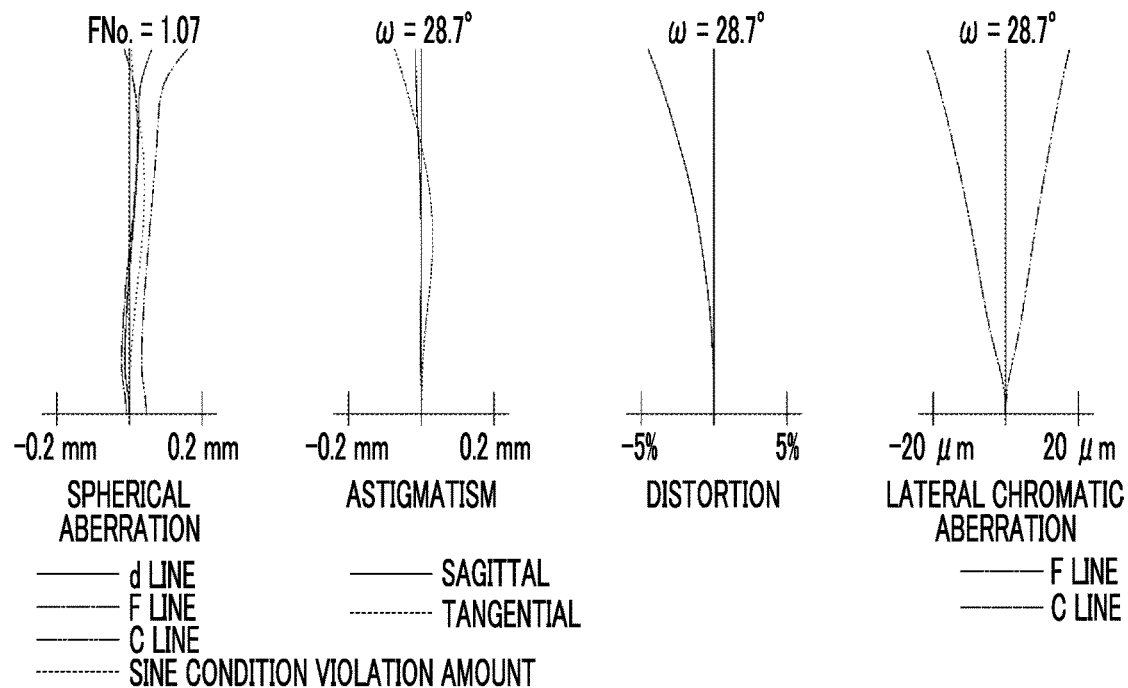
FIG. 17 is a diagram of aberrations of the imaging lens of Example 8 of the present invention.

FIG. 8 shows a cross-sectional view of a configuration and optical paths of the imaging lens of Example 8. The imaging lens of Example 8 comprises only eight lenses consisting of, in order from the object side to the image side, the first lens L1 to the eighth lens L8 as lenses having refractive powers, and has the basic configuration described above. Regarding the imaging lens of Example 8, Table 22 shows basic lens data, Table 23 shows values and specifications relating to the conditional expressions, Table 24 shows aspherical surface coefficients, and FIG. 17 shows aberration diagrams.

TABLE 22

Example 8

| Sn | R | D | Nd | vd | Light shielding member |
|---|---|---|---|---|---|
| 1 | 76.97057 | 2.00000 | 1.83481 | 42.7 | |
| 2 | 28.23134 | 17.58719 | | | |
| 3 | 112.95300 | 3.00000 | 1.72000 | 50.2 | |
| 4 | 38.95661 | 26.90056 | | | |
| 5 | −464.01498 | 20.00000 | 1.58313 | 59.4 | Φ44 |
| 6 | −51.46885 | 0.50000 | | | |
| 7 | 44.35132 | 10.00000 | 1.75500 | 52.3 | |
| 8 | −319.69725 | 7.00000 | | | Φ44 |
| 9(St) | ∞ | 16.99804 | | | |
| 10 | −22.31631 | 3.00000 | 1.92286 | 18.9 | |
| 11 | 62.08359 | 3.00000 | | | |
| 12 | 108.47120 | 10.00000 | 1.80100 | 35.0 | |
| 13 | −28.13742 | 0.10000 | | | |
| *14 | 48.56699 | 8.00000 | 1.80610 | 40.9 | |
| *15 | −46.34674 | 1.71479 | | | Φ30 |
| 16 | −73.25070 | 2.00000 | 1.95906 | 17.5 | |
| 17 | 3430.06956 | 15.00000 | | | |
| 18 | ∞ | 3.60000 | 1.51680 | 64.2 | |
| 19 | ∞ | 3.06647 | | | |
| 20 | ∞ | | | | |

TABLE 23

Example 8

| | |
|---|---|
| f | 16.8 |
| FNo. | 1.08 |
| 2ω | 57.5 |
| ED8r | 26.68 |
| TL | 152.24 |
| Bf | 20.44 |
| f1 | −54.4 |
| f12 | −28.9 |
| f23 | 310.3 |
| f45 | −174.0 |
| f456 | 90.2 |
| f6 | 28.8 |
| f7 | 30.6 |

TABLE 24

Example 8

| Sn | 14 | 15 |
|---|---|---|
| KA | 1.0000000E+00 | 1.0000000E+00 |
| A3 | 2.8676829E−05 | 3.3896500E−05 |
| A4 | −6.9069272E−06 | 2.1968088E−06 |
| A5 | 1.0716272E−07 | −2.3263762E−07 |
| A6 | −7.5124722E−09 | 7.4935461E−09 |

TABLE 25

Example 9

| Sn | R | D | Nd | vd | Light shielding member |
|---|---|---|---|---|---|
| 1 | 65.48575 | 2.00000 | 1.83481 | 42.7 | |
| 2 | 26.01465 | 6.27125 | | | |
| 3 | 180.27847 | 3.00000 | 1.72000 | 50.2 | |
| 4 | 33.15156 | 29.99659 | | | |
| 5 | 518.38382 | 20.00000 | 1.58313 | 59.4 | Φ51 |
| 6 | −45.30251 | 0.50000 | | | |
| 7 | 47.57602 | 10.00000 | 1.75500 | 52.3 | |
| 8 | 21014.60321 | 7.00000 | | | |
| 9(St) | ∞ | 20.44833 | | | |
| 10 | −23.25585 | 3.00000 | 2.10420 | 17.0 | |
| 11 | 89.54463 | 3.00000 | | | |
| 12 | 119.38402 | 10.00000 | 1.80100 | 35.0 | |
| 13 | −30.23344 | 0.10000 | | | |
| *14 | 48.37039 | 8.00000 | 1.69350 | 53.2 | |
| *15 | −41.27182 | 1.71479 | | | Φ34 |
| 16 | −70.59538 | 2.00000 | 2.10420 | 17.0 | |
| 17 | −78.06544 | 15.00000 | | | |
| 18 | ∞ | 3.60000 | 1.51680 | 64.2 | |
| 19 | ∞ | 4.02156 | | | |
| 20 | ∞ | | | | |

TABLE 26

Example 9

| | |
|---|---|
| f | 16.4 |
| FNo. | 0.95 |
| 2ω | 58 |
| ED8r | 31.55 |
| TL | 148.43 |
| Bf | 21.39 |
| f1 | −52.9 |
| f12 | −25.6 |
| f23 | 159.1 |
| f45 | −78.8 |
| f456 | 166.3 |
| f6 | 31.0 |
| f7 | 33.3 |

TABLE 27

Example 9

| Sn | 14 | 15 |
|---|---|---|
| KA | 1.0000000E+00 | 1.0000000E+00 |
| A3 | 5.8835577E−06 | −9.6259301E−06 |
| A4 | −9.9393326E−06 | 5.0144763E−06 |
| A5 | 1.5002933E−07 | −2.6483741E−07 |
| A6 | −8.4464704E−09 | 5.3929464E−09 |

Example 9

Figure 9:
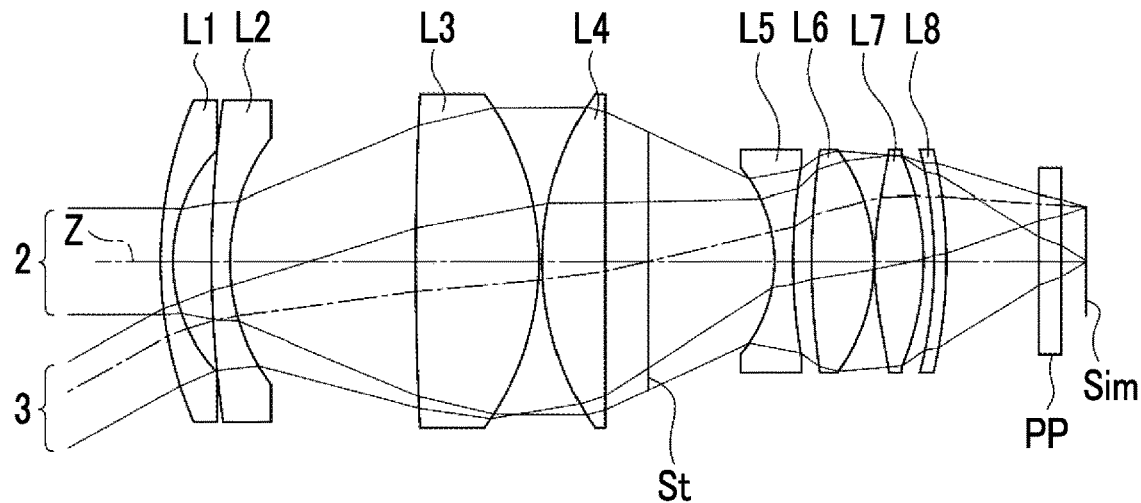
FIG. 9 is a cross-sectional view showing a configuration of an imaging lens of Example 9 of the present invention.
Figure 18:
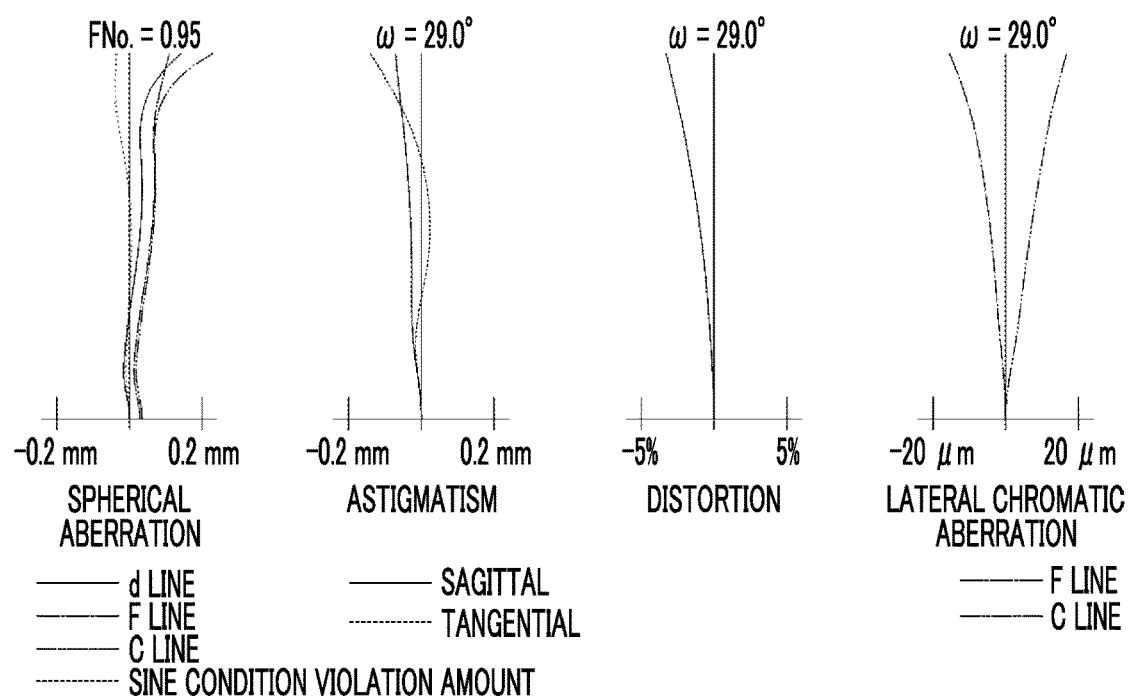
FIG. 18 is a diagram of aberrations of the imaging lens of Example 9 of the present invention.

FIG. 9 shows a cross-sectional view of a configuration and optical paths of the imaging lens of Example 9. The imaging lens of Example 9 comprises only eight lenses consisting of, in order from the object side to the image side, the first lens L1 to the eighth lens L8 as lenses having refractive powers, and has the basic configuration described above. Regarding the imaging lens of Example 9, Table 25 shows basic lens data, Table 26 shows values and specifications relating to the conditional expressions, Table 27 shows aspherical surface coefficients, and FIG. 18 shows aberration diagrams.

Regarding the imaging lenses of Examples 1 to 9, Table 28 shows corresponding values of Conditional Expressions (1) to (6), Table 29 shows corresponding values of Conditional Expressions (7) to (12), and Table 30 shows corresponding values of Conditional Expressions (13) to (16). In Examples 1 to 9, the d line is used as a reference wavelength. Tables 28, 29, and 30 show values based on the d line.

TABLE 28

| | (1) vd5 | (2) Db23/f | (3) f456/f | (4) f1/f | (5) f12/f | (6) f45/f |
|---|---|---|---|---|---|---|
| Example 1 | 17.47 | 1.64 | 7.88 | −2.93 | −1.54 | −5.38 |
| Example 2 | 17.47 | 2.14 | 9.29 | −3.24 | −1.85 | −3.42 |
| Example 3 | 17.47 | 1.66 | 5.85 | −3.44 | −1.76 | −10.24 |

TABLE 28-continued

|  | (1) vd5 | (2) Db23/f | (3) f456/f | (4) f1/f | (5) f12/f | (6) f45/f |
|---|---|---|---|---|---|---|
| Example 4 | 17.47 | 1.72 | 9.34 | −3.40 | −1.78 | −4.20 |
| Example 5 | 17.47 | 1.66 | 5.90 | −3.12 | −1.63 | −9.09 |
| Example 6 | 17.47 | 1.65 | 6.04 | −3.14 | −1.62 | −8.61 |
| Example 7 | 17.47 | 1.72 | 6.01 | −3.47 | −1.72 | −9.29 |
| Example 8 | 18.90 | 1.60 | 5.37 | −3.24 | −1.72 | −10.35 |
| Example 9 | 17.02 | 1.83 | 10.13 | −3.22 | −1.56 | −4.80 |

TABLE 29

|  | (7) f23/f | (8) f6/f | (9) f7/f | (10) TL/f | (11) Bf/f | (12) ED8r/Bf |
|---|---|---|---|---|---|---|
| Example 1 | 8.90 | 1.83 | 1.97 | 8.80 | 1.21 | 1.41 |
| Example 2 | 6.25 | 1.79 | 1.83 | 9.18 | 1.15 | 1.49 |
| Example 3 | 15.81 | 1.76 | 1.83 | 9.11 | 1.11 | 1.47 |
| Example 4 | 8.06 | 1.90 | 1.72 | 9.00 | 1.24 | 1.32 |
| Example 5 | 10.94 | 1.81 | 2.15 | 9.37 | 1.12 | 1.52 |
| Example 6 | 10.73 | 1.82 | 2.14 | 9.34 | 1.13 | 1.51 |
| Example 7 | 16.56 | 1.80 | 1.89 | 9.50 | 1.18 | 1.42 |
| Example 8 | 18.46 | 1.72 | 1.82 | 9.06 | 1.22 | 1.31 |
| Example 9 | 9.69 | 1.89 | 2.03 | 9.04 | 1.30 | 1.47 |

TABLE 30

|  | (13) (R1f + R1r) (R1f − R1r) | (14) (R2f + R2r) (R2f − R2r) | (15) (R3f + R3r) (R3f − R3r) | (16) (R5f + R5r) (R5f − R5r) |
|---|---|---|---|---|
| Example 1 | 2.03 | 1.15 | 0.63 | −0.54 |
| Example 2 | 1.93 | 1.69 | 0.60 | −0.58 |
| Example 3 | 2.00 | 1.92 | 1.25 | −0.49 |
| Example 4 | 2.60 | 1.07 | 0.53 | −0.53 |
| Example 5 | 1.82 | 2.05 | 0.87 | −0.51 |
| Example 6 | 1.75 | 1.94 | 0.77 | −0.52 |
| Example 7 | 2.21 | 1.97 | 1.11 | −0.48 |
| Example 8 | 2.16 | 2.05 | 1.25 | −0.47 |
| Example 9 | 2.32 | 1.45 | 0.84 | −0.59 |

As can be seen from the above data, the imaging lenses of Examples 1 to 9 each have a small F-number of 1.12 or less, and have high optical performance by satisfactorily correcting various aberrations.

Figure 19:
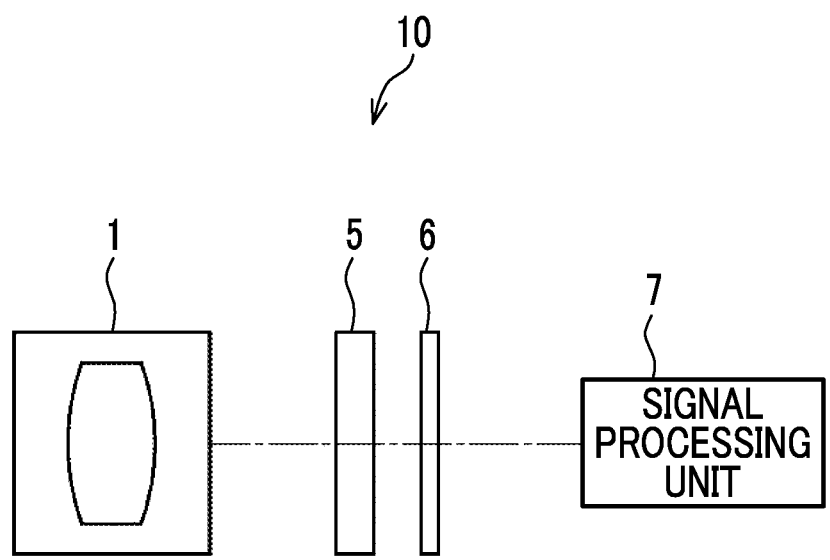
FIG. 19 is a schematic configuration diagram of an imaging apparatus according to the embodiment of the present invention.

Next, the imaging apparatus according to the embodiment of the present invention will be described. FIG. 19 shows a schematic configuration diagram of an imaging apparatus 10 using the imaging lens 1 according to the embodiment of the present invention, as an example of the imaging apparatus of the embodiment of the present invention. Examples of the imaging apparatus 10 may include a factory automation (FA) camera, a machine vision (MV) camera, a surveillance camera, an in-vehicle camera, and a digital camera.

The imaging apparatus 10 comprises the imaging lens 1, a filter 5, an imaging element 6, and a signal processing unit 7 that performs arithmetic processing of an output signal from the imaging element 6. FIG. 19 conceptually shows the imaging lens 1. The imaging element 6 captures a subject image formed by the imaging lens 1 and converts the image into an electric signal, and for example, a charge coupled device (CCD) or a complementary metal oxide semiconductor (CMOS) can be used. The imaging element 6 is disposed so that the imaging surface thereof matches the image plane Sim of the imaging lens 1.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspherical surface coefficient of each lens are not limited to the values shown in the numerical examples, and different values may be used therefor.

What is claimed is:

1. An imaging lens comprising:
   only eight lenses consisting of, in order from an object side to an image side,
   a first lens that has a negative refractive power,
   a second lens that has a negative refractive power,
   a third lens that has a positive refractive power and of which an image side surface is convex,
   a fourth lens that has a positive refractive power and of which an object side surface is convex,
   a fifth lens that has a negative refractive power,
   a sixth lens that has a positive refractive power and of which an image side surface is convex,
   a seventh lens that has a positive refractive power and of which an object side surface is convex, and
   an eighth lens that has a negative refractive power, as lenses having refractive powers,
   wherein in the sixth lens, an absolute value of a radius of curvature of the image side surface is smaller than an absolute value of a radius of curvature of an object side surface, and
   wherein assuming that an Abbe number of the fifth lens at a d line is vd5, Conditional Expression (1) is satisfied, which is represented by $$vd5<23 \qquad (1).$$

2. The imaging lens according to claim 1,
   wherein in the third lens, an absolute value of a radius of curvature of the image side surface is smaller than an absolute value of a radius of curvature of an object side surface.

3. The imaging lens according to claim 1,
   wherein in the fourth lens, an absolute value of a radius of curvature of an image side surface is larger than an absolute value of a radius of curvature of the object side surface.

4. The imaging lens according to claim 1,
   wherein in the seventh lens, an absolute value of a radius of curvature of an image side surface is larger than an absolute value of a radius of curvature of the object side surface.

5. The imaging lens according to claim 1,
   wherein assuming that a focal length of the first lens is f1 and a focal length of the imaging lens is f, Conditional Expression (4) is satisfied, which is represented by $$-8<f1/f<-0.5 \qquad (4).$$

6. The imaging lens according to claim 1,
   wherein assuming that a composite focal length of the first lens and the second lens is f12 and a focal length of the imaging lens is f, Conditional Expression (5) is satisfied, which is represented by $$-8<f12/f<-0.5 \qquad (5).$$

7. The imaging lens according to claim 1,
   wherein assuming that a composite focal length of the fourth lens and the fifth lens is f45 and a focal length of the imaging lens is f, Conditional Expression (6) is satisfied, which is represented by $$f45/f<-0.5 \qquad (6).$$

8. The imaging lens according to claim 1,
wherein assuming that a composite focal length of the second lens and the third lens is f23 and a focal length of the imaging lens is f, Conditional Expression (7) is satisfied, which is represented by $$2<f23/f<30 \tag{7}$$

9. The imaging lens according to claim 1,
wherein assuming that a focal length of the sixth lens is f6 and a focal length of the imaging lens is f, Conditional Expression (8) is satisfied, which is represented by $$0.5<f6/f \tag{8}$$

10. The imaging lens according to claim 1,
wherein assuming that a focal length of the seventh lens is f7 and a focal length of the imaging lens is f, Conditional Expression (9) is satisfied, which is represented by $$0.5<f7/f \tag{9}$$

11. The imaging lens according to claim 1,
wherein assuming that a sum of a distance on an optical axis from an object side surface of the first lens to an image side surface of the eighth lens and a back focal length as an air conversion distance is TL and a focal length of the imaging lens is f, Conditional Expression (10) is satisfied, which is represented by $$3<TL/f<20 \tag{10}$$

12. The imaging lens according to claim 1,
wherein assuming that a back focal length as an air conversion distance is Bf and a focal length of the imaging lens is f, Conditional Expression (11) is satisfied, which is represented by $$0.5<Bf/f<5 \tag{11}$$

13. The imaging lens according to claim 1,
wherein assuming that an effective diameter of an image side surface of the eighth lens is ED8r and a back focal length as an air conversion distance is Bf, Conditional Expression (12) is satisfied, which is represented by $$0.6<ED8r/Bf<2.2 \tag{12}$$

14. An imaging apparatus comprising:
the imaging lens according to claim 1.
15. An imaging lens comprising:
only eight lenses consisting of, in order from an object side to an image side,
a first lens that has a negative refractive power,
a second lens that has a negative refractive power,
a third lens that has a positive refractive power and of which an image side surface is convex,
a fourth lens that has a positive refractive power and of which an object side surface is convex,
a fifth lens that has a negative refractive power,
a sixth lens that has a positive refractive power and of which an image side surface is convex,
a seventh lens that has a positive refractive power and of which an object side surface is convex, and
an eighth lens that has a negative refractive power, as lenses having refractive powers,
wherein in the sixth lens, an absolute value of a radius of curvature of the image side surface is smaller than an absolute value of a radius of curvature of an object side surface, and
wherein assuming that a distance on an optical axis between the second lens and the third lens is Db23 and a focal length of the imaging lens is f, Conditional Expression (2) is satisfied, which is represented by $$0.8<Db23/f<7 \tag{2}$$

16. An imaging apparatus comprising:
the imaging lens according to claim 15.
17. An imaging lens comprising:
only eight lenses consisting of, in order from an object side to an image side,
a first lens that has a negative refractive power,
a second lens that has a negative refractive power,
a third lens that has a positive refractive power and of which an image side surface is convex,
a fourth lens that has a positive refractive power and of which an object side surface is convex,
a fifth lens that has a negative refractive power,
a sixth lens that has a positive refractive power and of which an image side surface is convex,
a seventh lens that has a positive refractive power and of which an object side surface is convex, and
an eighth lens that has a negative refractive power, as lenses having refractive powers,
wherein in the sixth lens, an absolute value of a radius of curvature of the image side surface is smaller than an absolute value of a radius of curvature of an object side surface, and
wherein assuming that a composite focal length of the fourth lens, the fifth lens, and the sixth lens is f456 and a focal length of the imaging lens is f, Conditional Expression (3a) is satisfied, which is represented by $$4.5<f456/f<28 \tag{3a}$$

18. An imaging apparatus comprising:
the imaging lens according to claim 17.

* * * * *